United States Patent
Hwang et al.

(10) Patent No.: US 11,449,220 B2
(45) Date of Patent: Sep. 20, 2022

(54) ELECTRONIC DEVICE INCLUDING TOUCH SENSITIVE DISPLAY AND METHOD FOR MANAGING THE DISPLAY

(71) Applicant: Samsung Electronics Co., Ltd., Suwon-si (KR)

(72) Inventors: Daesik Hwang, Daegu (KR); Hyesoon Jeong, Chilgok-gun (KR); Jihun Kim, Seoul (KR); Jaegyun Son, Yeongcheon-si (KR); Dongjeon Kim, Anyang-si (KR); Jinwan An, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/915,081

(22) Filed: Jun. 29, 2020

(65) Prior Publication Data
US 2020/0326844 A1 Oct. 15, 2020

Related U.S. Application Data

(63) Continuation of application No. 14/832,483, filed on Aug. 21, 2015, now Pat. No. 10,739,987.

(30) Foreign Application Priority Data

Aug. 28, 2014 (KR) ........................ 10-2014-0113373

(51) Int. Cl.
*G06F 3/04883* (2022.01)
*G06F 3/04817* (2022.01)

(52) U.S. Cl.
CPC ...... *G06F 3/04883* (2013.01); *G06F 3/04817* (2013.01); *G06F 2203/04803* (2013.01)

(58) Field of Classification Search
CPC .. G06F 3/04883; G06F 3/0412; G06F 3/0481; G06F 3/04817; G06F 3/0482;
(Continued)

(56) References Cited

U.S. PATENT DOCUMENTS

| 5,487,143 A * | 1/1996 | Southgate ............. G06F 3/0481 |
| | | 715/790 |
| 5,712,995 A | 1/1998 | Cohn |

(Continued)

FOREIGN PATENT DOCUMENTS

| CN | 101606124 A | 12/2009 |
| CN | 101609387 A | 12/2009 |

(Continued)

OTHER PUBLICATIONS

The YouTube Tech Guy, "Galaxy Note 10.1—How To Use the Split Screen Multi Tasking," Sep. 5, 2012, https://www.youtube.com/watch?v=DTjV8WF_64U, 4 pages (Year: 2012).*

(Continued)

*Primary Examiner* — Tadesse Hailu
(74) *Attorney, Agent, or Firm* — Jefferson IP Law, LLP

(57) ABSTRACT

A method for operating an electronic device including a touch sensitive display is provided. The method includes displaying at least two application execution screens on the touch sensitive display not to be superposed on one another, receiving a touch input or a hovering input through the touch sensitive display, selecting at least one application execution screen among the at least two application execution screens at least partially in response to the reception of the touch input or the hovering input, and displaying the selected application execution screen to be superposed on at least a portion of a non-selected application execution screen among the at least two application execution screens.

14 Claims, 56 Drawing Sheets

(58) Field of Classification Search
CPC ............. G06F 3/04842; G06F 3/04845; G06F 3/04886; G06F 2203/04108; G06F 2203/04803
See application file for complete search history.

(56) References Cited

U.S. PATENT DOCUMENTS

| | | | |
|---|---|---|---|
| 6,195,094 B1 * | 2/2001 | Celebiler | G06F 3/0481 715/764 |
| 6,198,094 B1 | 3/2001 | Freier et al. | |
| 6,252,595 B1 * | 6/2001 | Birmingham | G06F 3/0481 715/803 |
| 7,752,566 B1 * | 7/2010 | Nelson | G06F 3/0412 715/769 |
| 9,910,555 B2 * | 3/2018 | Sun | G06F 3/0481 |
| 2004/0239684 A1 | 12/2004 | Mcguire et al. | |
| 2005/0125742 A1 | 6/2005 | Grotjohn et al. | |
| 2006/0277488 A1 | 12/2006 | Cok et al. | |
| 2008/0163053 A1 | 7/2008 | Hwang et al. | |
| 2008/0195969 A1 * | 8/2008 | Brown | G06F 3/04847 715/802 |
| 2010/0088634 A1 * | 4/2010 | Tsuruta | G09G 5/14 715/800 |
| 2010/0138767 A1 | 6/2010 | Wang et al. | |
| 2010/0241989 A1 | 9/2010 | Wen | |
| 2010/0299597 A1 | 11/2010 | Shin et al. | |
| 2011/0093816 A1 | 4/2011 | Chang et al. | |
| 2011/0175930 A1 | 7/2011 | Hwang et al. | |
| 2011/0179387 A1 | 7/2011 | Shaffer et al. | |
| 2011/0244924 A1 | 10/2011 | Jung et al. | |
| 2012/0159386 A1 | 6/2012 | Kang et al. | |
| 2012/0210273 A1 | 8/2012 | Seong et al. | |
| 2013/0072262 A1 | 3/2013 | Mhun et al. | |
| 2013/0120295 A1 | 5/2013 | Kim et al. | |
| 2013/0120447 A1 | 5/2013 | Kim et al. | |
| 2013/0167058 A1 | 6/2013 | Levee et al. | |
| 2013/0305184 A1 | 11/2013 | Kim et al. | |
| 2014/0075332 A1 | 3/2014 | Jeon | |
| 2014/0089833 A1 | 3/2014 | Hwang et al. | |
| 2014/0096053 A1 | 4/2014 | Lee et al. | |
| 2014/0164957 A1 | 6/2014 | Shin et al. | |
| 2014/0164990 A1 | 6/2014 | Kim et al. | |
| 2014/0164991 A1 | 6/2014 | Kim et al. | |
| 2014/0204040 A1 * | 7/2014 | Kim | G06F 3/0483 345/173 |
| 2014/0351748 A1 | 11/2014 | Xia et al. | |
| 2014/0361083 A1 * | 12/2014 | Shao | G06K 7/1439 235/462.1 |
| 2015/0074589 A1 * | 3/2015 | Pan | G06F 3/04886 715/781 |
| 2015/0121271 A1 | 4/2015 | Huang et al. | |
| 2015/0242076 A1 | 8/2015 | Jo et al. | |
| 2015/0281627 A1 * | 10/2015 | Wang | H04N 5/45 348/565 |
| 2016/0351168 A1 * | 12/2016 | Yan | G06F 9/451 |
| 2016/0370864 A1 * | 12/2016 | Choi | G06F 3/0481 |

FOREIGN PATENT DOCUMENTS

| | | |
|---|---|---|
| CN | 102129345 A | 7/2011 |
| CN | 102193719 A | 9/2011 |
| CN | 103577059 A | 2/2014 |
| CN | 103685722 A | 3/2014 |
| CN | 103716453 A | 4/2014 |
| CN | 103777887 A | 5/2014 |
| CN | 103116438 B | 9/2018 |
| KR | 10-2011-0067569 A | 6/2011 |
| KR | 10-2013-0054071 A | 5/2013 |
| KR | 10-2014-0032536 A | 3/2014 |
| KR | 10-2014-0039575 A | 4/2014 |
| KR | 10-2102438 B1 | 4/2020 |

OTHER PUBLICATIONS

The You Tube Tech Guy; "Galaxy Note 10.1: How to Use the Split Screen Multi Tasking"; Sep. 5, 2012; https://www_youtube.com/watch?v=DTjV8WF 64U; XP054978244.

Chris Hoffman; "4 Hidden Window Management Tricks on the Windows Desktop"; How to Geek; Feb. 5, 2014; https://www.howtogeek.com/181681/4-hidden-window-management-tricks-0n-the-windows-desktop/; XP055465802.

Anonymous; Windows 8 From Wikipedia, the free encyclopedia; Aug. 22, 2014; Retrieved from "https://en.wikipedia.org/w/indexphp?tille=Windows_8&oldid=622364854"; XP055245532.

Brink; Taskbar Button Grouping—Enable or Disable—How to Enable or Disable Taskbar Button Grouping in Windows Fourms; Windows SevenFourms, Nov. 13, 2008; https:www.sevenfourms.com/496-taslkbar-button-grouping-e~able-disable.html; XP055466428.

"Galaxy Note 10.1—Howto Use the Split Screen Multi Tasking," Sep. 5, 2012, https://www.youtube.com/watch?v=DTjV8WF_64U, 4 pages (Year: 2012).

Chinese Office Action dated Jul. 30, 2020, issued in Chinese Patent Application No. 201510543132.3.

European Office Action dated Jul. 26, 2021, issued in European Patent Application No. 19 171 019.3.

European Search Report dated Jul. 28, 2021, issued in European Patent Application No. 21179439.1.

Chinese Office Action dated Aug. 16, 2021, issued in Chinese Patent Application No. 202110255994.1.

Korean Office Action dated Aug. 25, 2021, issued in Korean Patent Application No. 10-2014-0113373.

* cited by examiner

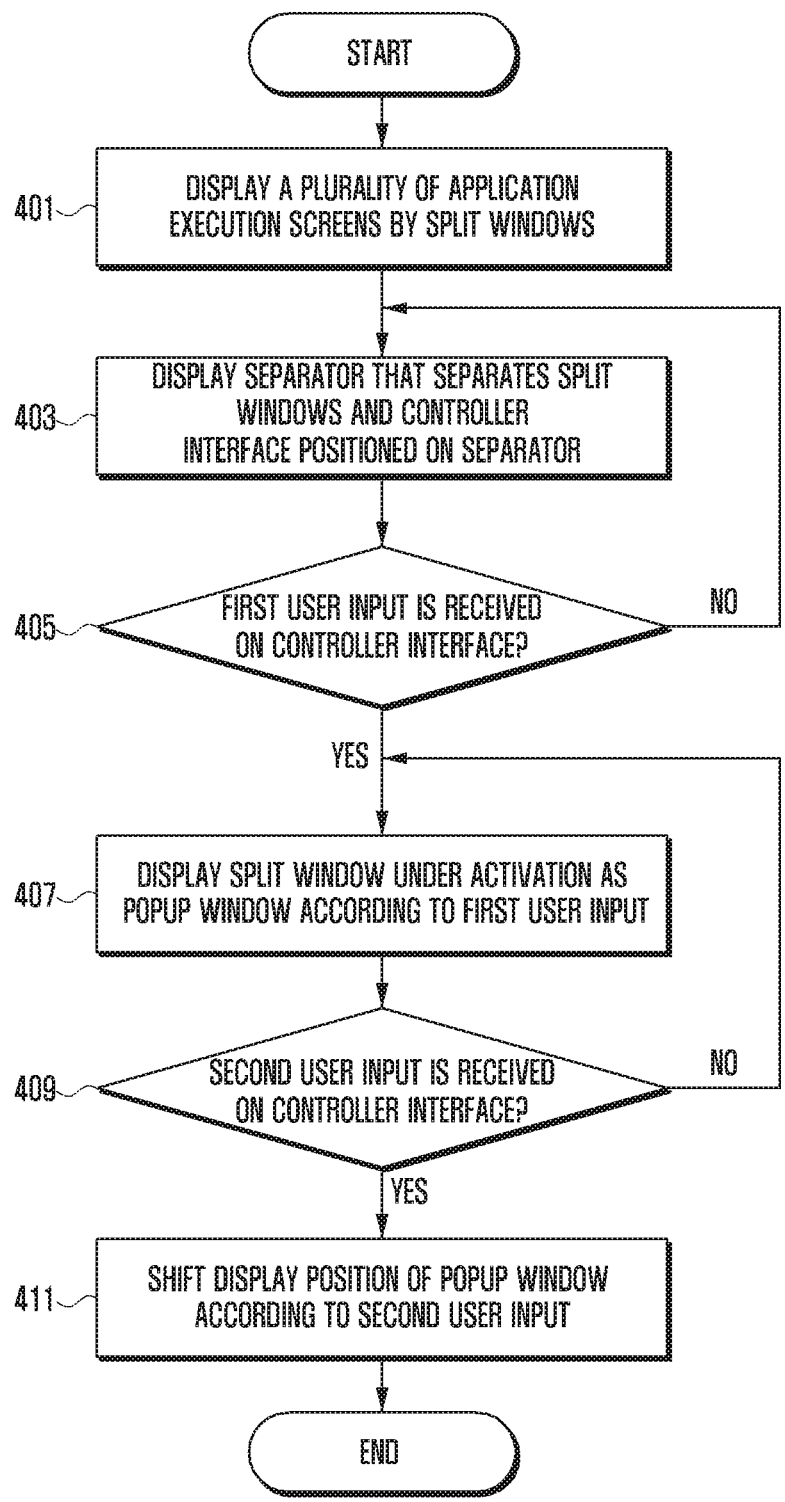

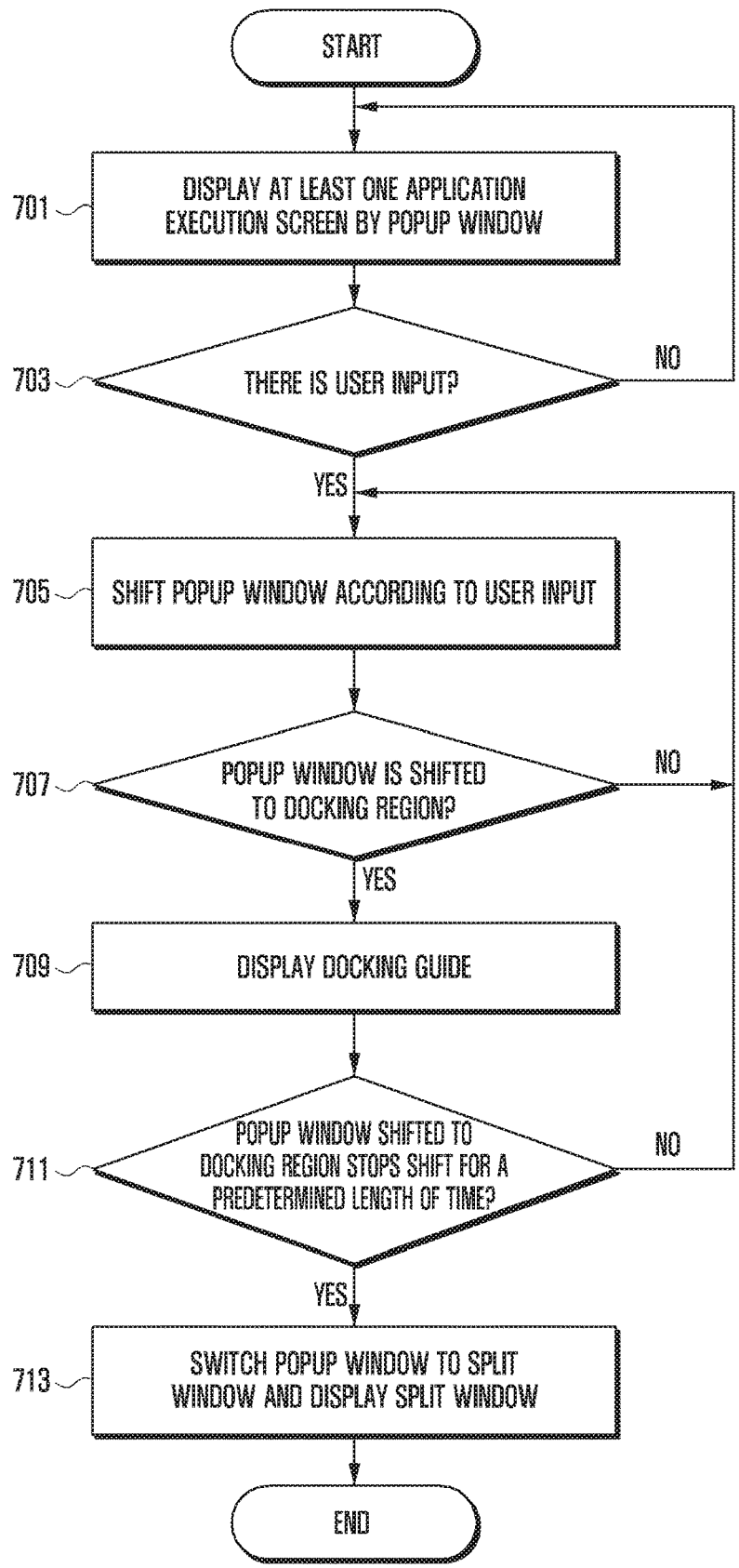

ELECTRONIC DEVICE INCLUDING TOUCH SENSITIVE DISPLAY AND METHOD FOR MANAGING THE DISPLAY

CROSS-REFERENCE TO RELATED APPLICATION(S)

This application is a continuation application of prior application Ser. No. 14/832,483, filed on Aug. 21, 2015, which claimed priority under 35 U.S.C. § 119(a) of a Korean patent application filed on Aug. 28, 2014 in the Korean Intellectual Property Office and assigned Serial number 10-2014-0113373, the entire disclosure of which is hereby incorporated by reference.

TECHNICAL FIELD

The present disclosure relates to a method and device for displaying at least two application execution screens through a touch sensitive display.

BACKGROUND

With current advancement of digital techniques, various electronic devices enabling communication and personal information processing while moving, such as a mobile communication terminal, a personal digital assistant (PDA), an electronic scheduler, a smart phone, and a tablet personal computer (PC), have been released. Such electronic devices are at the stage of mobile convergence embracing the areas of other terminals without staying their own grounds. Typically, the electronic devices may be provided with, e.g., a call function, such as voice call and image call, a message transmission/reception function, such as short message service (SMS)/multimedia message service (MMS) and e-mail, an electronic scheduler function, a photographing function, a broadcasting reproducing function, a video image reproducing function, a music playing function, an internet function, a messenger function, and a social networking service (SNS) function.

The above information is presented as background information only to assist with an understanding of the present disclosure. No determination has been made, and no assertion is made, as to whether any of the above might be applicable as prior art with regard to the present disclosure.

SUMMARY

In the past, an electronic device including a touch sensitive display has not provided a method of heuristically converting two or more application execution screens, and thus, users have had trouble in window switching.

Aspects of the present disclosure are to address at least the above-mentioned problems and/or disadvantages and to provide at least the advantages described below. Accordingly, an aspect of the present disclosure is to provide a method and device for freely converting application execution screens according to a user input on a touch sensitive display.

In accordance with an aspect of the present disclosure, a method for operating an electronic device including a touch sensitive display is provided. The method includes displaying at least two application execution screens on the touch sensitive display not to be superposed one on another, receiving a touch input or a hovering input through the touch sensitive display, selecting at least one application execution screen among the at least two application execution screens at least partially in response to the reception of the touch input or the hovering input, and displaying the selected at least one application execution screen to be superposed on at least a portion of a non-selected application execution screen among the at least two application execution screens.

In accordance with another aspect of the present disclosure, a method of operating an electronic device including a touch sensitive display is provided. The method includes displaying a first application execution screen, receiving a first user input, determining whether the received first user input is released after having been input to a first point, when the received first user input is released after having been input to the first point, displaying the first application execution screen to be superposed on at least a portion of another application execution screen, and when the received first user input is released after having been input to a second point via the first point, displaying the first application and a second application that is being executed in a background not to be superposed on one another.

In accordance with another aspect of the present disclosure, an electronic device is provided. The electronic device includes a touch sensitive display configured to display an application or function execution screen, and to receive a touch input, and a control unit configured to perform a control such that the execution screen is displayed on the touch sensitive display, and to control an operation according to the touch input. The control unit displays at least two application execution screens on the touch sensitive display not to be superposed on one another, receive a touch input or a hovering input through the touch sensitive display, select at least one application execution screen among the at least two application execution screens at least partially in response to the reception of the touch input or the hovering input, and display the selected at least one application execution screen to be superposed on at least a portion of a non-selected application execution screen among the at least two application execution screens.

In accordance with another aspect of the present disclosure, an electronic device is provided. The electronic device includes a touch sensitive display configured to display an application or function execution screen, and to receive a touch input, and a control unit configured to perform a control such that the execution screen is displayed on the touch sensitive display, and to control an operation according to the touch input. The control unit is configured to display a first application execution screen, and receive a first user input, and determine whether the received first user input is released after having been input to a first point. When the received first user input is released after having been input to the first point, the control unit is configured to display the first application execution screen to be superposed on at least a portion of another application execution screen. When the received first user input is released after having been input to a second point via the first point, the control unit is configured to display the first application and a second application that is being executed in a background not to be superposed on one another.

In accordance with another aspect of the present disclosure, an electronic device is provided. The electronic device includes a touch sensitive display configured to display an application or function execution screen, and to receive a touch input, and a control unit configured to perform a control such that the execution screen is displayed on the touch sensitive display, and to control an operation according to the touch input. The control unit is configured to display a plurality of application execution screens by split windows on the touch sensitive display, display a separator that separates the split windows and a controller interface positioned on the separator on the touch sensitive display, and receive a first user unit on the controller interface through the touch sensitive display, and display the split windows as a popup window on the touch sensitive screen according to the received first user input.

According to various embodiments of the present disclosure, the electronic device including the touch sensitive display allows methods of displaying at least two application execution screens to be freely switched. Thus, it is possible to provide a user interface that allows a user to easily execute or control at least two applications. For example, when the at least two application screens are displayed as a multi-window, free switching between a split window and a popup window is intuitively enabled according to a user input.

According to various embodiments of the present disclosure, for example, by providing a user interface efficient for supporting a multi-window environment such as a split window or a popup window, the user's convenience may be enhanced, and the usability, convenience, and competitiveness of the electronic device may be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a flowchart illustrating a method of aligning a position of a popup window after switching from a split window to the popup window is performed in an electronic device according to an embodiment of the present disclosure;

FIG. 7 is a flowchart illustrating a method of performing switching from a popup window to a split window in an electronic device according to an embodiment of the present disclosure;

Throughout the drawings, it should be noted that like reference numbers are used to depict the same or similar elements, features, and structures.

DETAILED DESCRIPTION

Figure 1A:
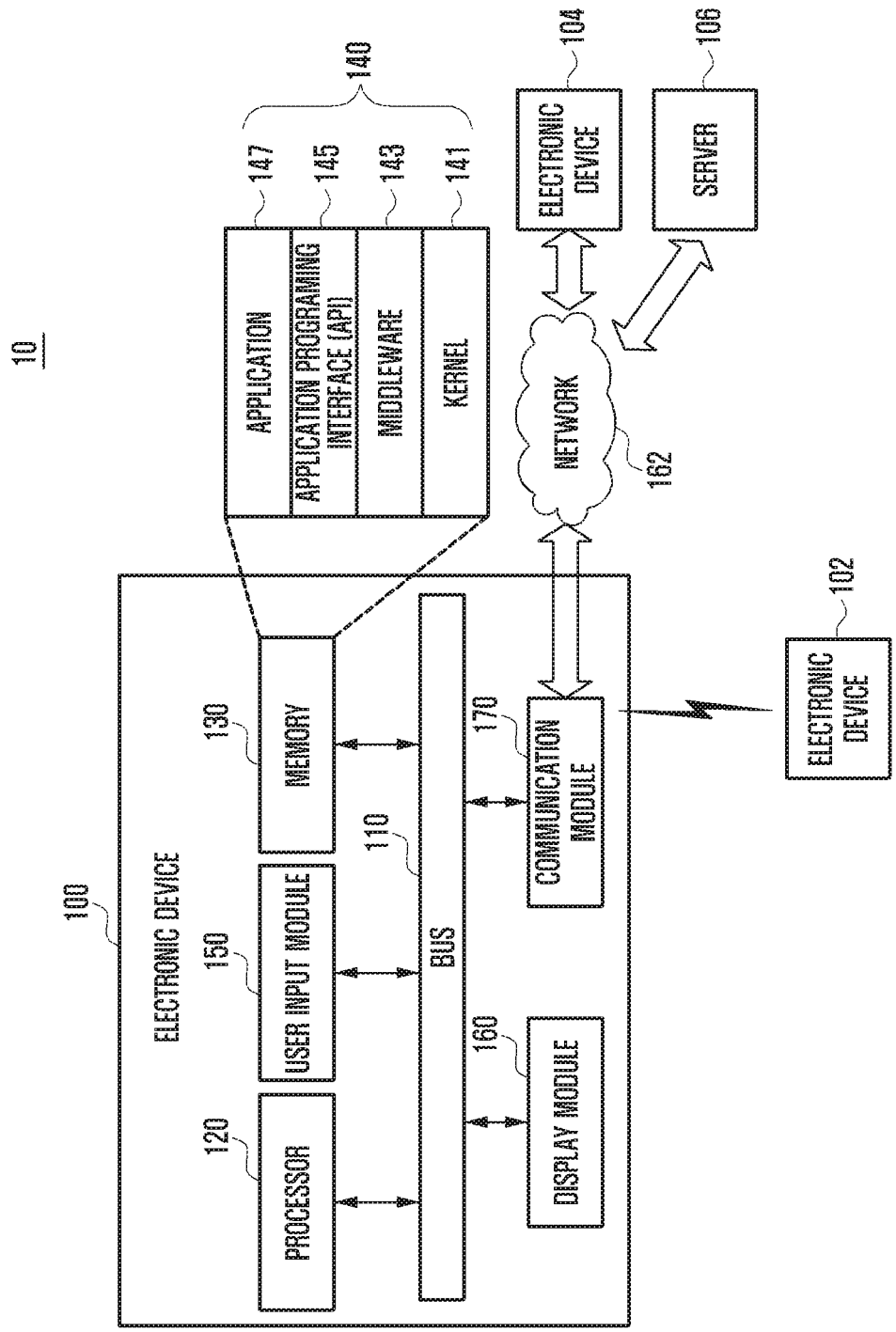
FIG. 1A is a diagram related to an electronic device within a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" which may be used in describing various embodiments of the present disclosure refers to the existence of a corresponding disclosed function, operation or component which may be used in various embodiments of the present disclosure and does not limit one or more additional functions, operations, or components. In various embodiments of the present disclosure, the terms such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet personal computer (PC), a mobile phone, a video phone, an e-book reader, a desktop PC, a laptop PC, a netbook computer, a personal digital assistant (PDA), a camera, a wearable device (e.g., a head-mounted-device (HMD) such as electronic glasses, electronic clothes, and electronic bracelet, an electronic necklace, an electronic appcessary, an electronic tattoo, and a smart watch.

According to various embodiments of the present disclosure, the electronic device may be a smart home appliance having a communication function. The smart home appliance may include at least one of a television (TV), a digital video disc (DVD) player, an audio player, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and an electronic frame.

According to various embodiments of the present disclosure, the electronic device may include at least one of various types of medical devices (e.g., magnetic resonance angiography (MRA), magnetic resonance imaging (MRI), computed tomography (CT), a scanner, an ultrasonic device and the like), a navigation device, a global positioning system (GPS) receiver, an event data recorder (EDR), a flight data recorder (FDR), a vehicle infotainment device, electronic equipment for a ship (e.g., a navigation device for ship, a gyro compass and the like), avionics, a security device, a head unit for a vehicle, an industrial or home robot, an automatic teller machine (ATM) of financial institutions, and a point of sale (POS) device of shops.

According to various embodiments of the present disclosure, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (e.g., an artificial intelligence electronic device) which uses an electronic device.

According to an embodiment of the present disclosure, a screen of an electronic device may be split into at least two windows according to a predefined split manner and displayed through a display of an electronic device. The windows are defined as split windows. According to an embodiment, the split windows are defined as windows displayed on a display of an electronic display not to be superposed on another.

According to an embodiment, a popup window is defined as a window displayed on a display of an electronic device to hide or to be superposed on a portion of a screen under execution.

According to an embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1A illustrates a network environment including an electronic device according to various embodiments of the present disclosure.

Referring to FIG. 1A, the electronic device 100 in a network environment 10 includes a bus 110, a processor 120, a memory 130, a user input module 150, a display module 160 and a communication module 170.

The bus 110 may be a circuit connecting the above described components and transmitting communication (e.g., a control message) between the above described components. The processor 120 receives commands from other components (e.g., the memory 130, the user input module 150, the display module 160, the communication module 170) through the bus 110, analyzes the received commands, and executes calculation or data processing according to the analyzed commands. The memory 130 stores commands or data received from the processor 120 or other components (e.g., the user input module 150, the display module 160, or the communication module 170) or generated by the processor 120 or other components. The memory 130 may include programming modules 140, for example, a kernel 141, middleware 143, an application programming interface (API) 145, and an application 147. Each of the aforementioned programming modules may be implemented by software, firmware, hardware, or a combination of two or more thereof.

The kernel 141 controls or manages system resources (e.g., the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (e.g., scheduling or load balancing) by using a method of assigning a priority, by which system resources (e.g., the bus 110, the processor 120, the memory 130 and the like) of the electronic device 100 may be used, to the application 134.

The API 145 is an interface by which the application 147 may control a function provided by the kernel 141 or the middleware 143 and includes, for example, at least one interface or function (e.g., command) for a file control, a window control, image processing, or a character control. The user input module 150 may receive, for example, a command and/or data from a user, and transfer the received command and/or data to the processor 120 and/or the memory 130 through the bus 110. The display module 160 may display an image, a video, and/or data to a user.

According to an embodiment, the display module 160 may display a graphic user interface image for interaction between the user and the electronic device 100. According to various embodiments, the graphic user interface image may include interface information to activate a function for correcting color of the image to be projected onto the screen. The interface information may be in the form of, for example, a button, a menu, or an icon. The communication module 170 connects communication between the electronic device 100 and the external device (e.g., external electronic device 102, 104 or server 106). For example, the communication interface 160 may access a network 162 through wireless or wired communication to communicate with the external device. The wireless communication includes at least one of, for example, WiFi, Bluetooth (BT), near field communication (NFC), a GPS, and cellular communication (e.g., long term evolution (LTE), LTE-advanced (LTE-A), code division multiple access (CDMA), wideband CDMA (WCDMA), universal mobile telecommunications system (UMTS), wireless broadband (WiBro) or global system for mobile communications (GSM)). The wired communication may include at least one of, for example, a universal serial bus (USB), a high definition multimedia interface (HDMI), recommended standard 232 (RS-232), and a plain old telephone service (POTS).

According to an embodiment, the server 106 supports driving of the electronic device 100 by performing at least one operation (or function) implemented by the electronic device 100. For example, the server 106 may include a communication control server module that supports the communication module 170 implemented in the electronic device 100. For example, the communication control server module may include at least one of the components of the communication module 170 to perform (on behalf of) at least one operations performed by the communication module 170.

Figure 1B:
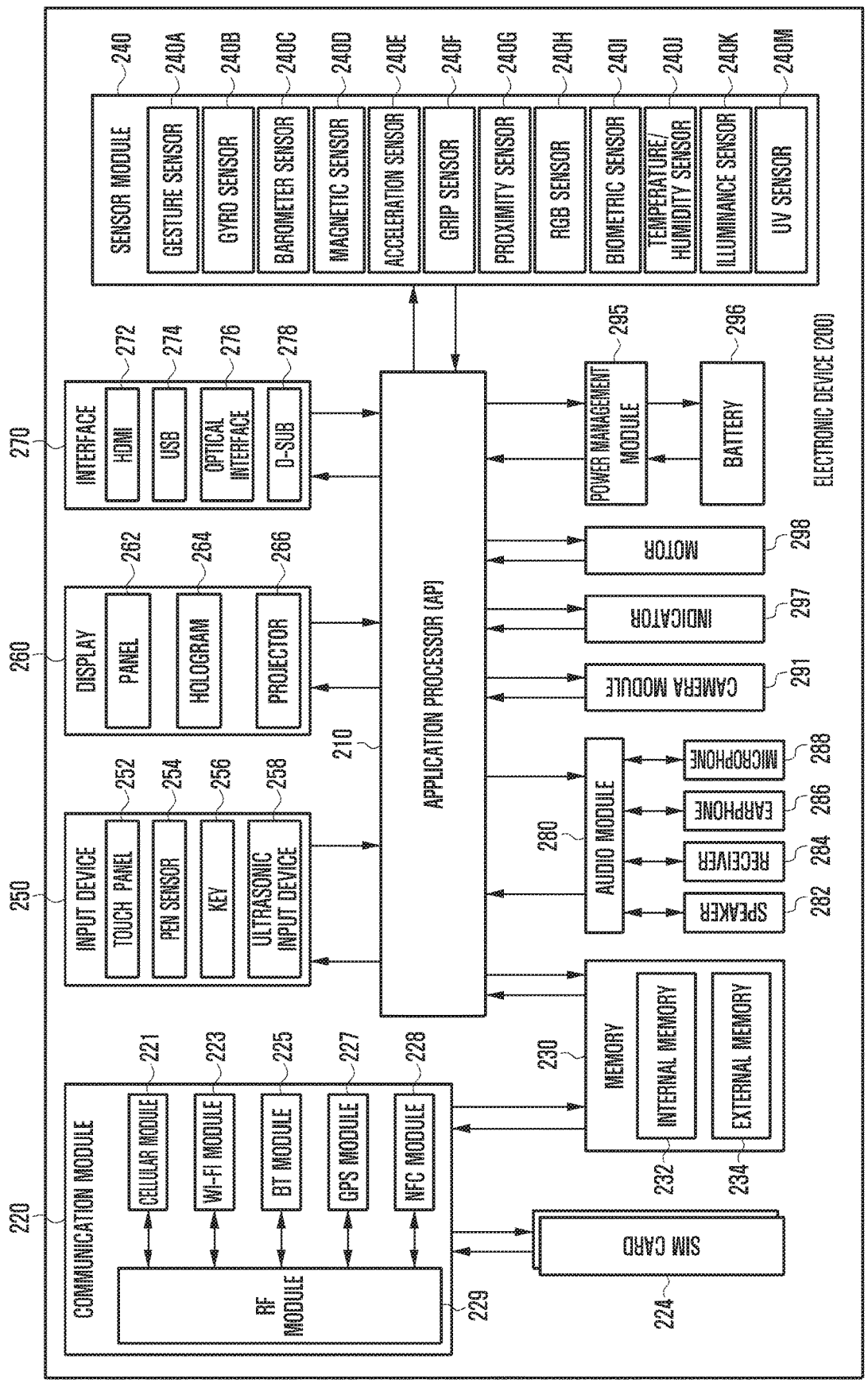
FIG. 1B is a block diagram of an electronic device according to various embodiments of the present disclosure.

FIG. 1B is a block diagram of an electronic device according to various embodiments of the present disclosure. The electronic device may configure, for example, a whole or a part of the electronic device 100 illustrated in FIG. 1A.

Referring to FIG. 1B, an electronic device 200 includes one or more application processors (APs) 210, a communication module 220, a subscriber identification module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a system on chip (SoC). According to an embodiment, the processor 210 may further include a graphics processing unit (GPU).

The communication module 220 (e.g., communication module 170) transmits/receives data in communication between different electronic devices (e.g., the external electronic device 104 and the server 106) connected to the electronic device 200 (e.g., electronic device 100) through a network. According to an embodiment, the communication module 220 includes a cellular module 221, a WiFi module 223, a BT module 225, a GPS module 227, a NFC module 228, and a radio frequency (RF) module 229.

The cellular module 221 provides a voice, a call, a video call, a short message service (SMS), or an Internet service through a communication network (e.g., LTE, LTE-A, CDMA, WCDMA, UMTS, WiBro, GSM and the like). Further, the cellular module 221 may distinguish and authenticate electronic devices within a communication network by using a SIM (e.g., the SIM card 224). According to an embodiment, the cellular module 221 performs at least some of the functions which may be provided by the AP 210. For example, the cellular module 221 may perform at least some of the multimedia control functions.

According to an embodiment, the cellular module 221 may include a communication processor (CP). Further, the cellular module 221 may be implemented by, for example, an SoC.

According to an embodiment, the AP 210 or the cellular module 221 (f e.g., communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are illustrated as blocks separate from each other in FIG. 1B, at least some (e.g., two or more) of the cellular module 221, the WiFi module 223, the BT module 225, the GPS module 227, and the NFC module 228 may be included in one integrated chip (IC) or one IC package according to an embodiment. For example, at least some (e.g., the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a power amp module (PAM), a frequency filter, a low noise amplifier (LNA) and the like. Further, the RF module 229 may further include a component for transmitting/receiving electronic waves over a free air space in wireless communication, for example, a conductor, a conducting wire, and the like. Although the cellular module 221, the WiFi module 223, the BT module 225, the GPS module 227, and the NFC module 228 share one RF module 229 in FIGS. 2A and 2B, at least one of the cellular module 221, the WiFi module 223, the BT module 225, the GPS module 227, and the NFC module 228 may transmit/receive an RF signal through a separate RF module according to an embodiment.

The SIM card 224 is a card including a Subscriber Identification Module and may be inserted into a slot formed in a particular portion of the electronic device. The SIM card 224 includes unique identification information (e.g., integrated circuit card identifier (ICCID)) or subscriber information (e.g., international mobile subscriber identity (IMSI).

The memory 230 (e.g., memory 130) may include an internal memory 232 or an external memory 234. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile Memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like).

According to an embodiment, the internal memory 232 may be a solid state drive (SSD). The external memory 234 may further include a flash drive, for example, a compact flash (CF), a secure digital (SD), a micro-SD, a mini-SD, an extreme digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (e.g., red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which may detect an acoustic wave by a microphone (e.g., microphone 288) of the electronic device 200 through an input means generating an ultrasonic signal to identify data and may perform wireless recognition. According to an embodiment, the electronic device 200 receives a user input from an external device (e.g., computer or server) connected to the electronic device 200 by using the communication module 220.

The display 260 (e.g., display module 160) includes a panel 262, a hologram device 264, and a projector 266. The panel 262 may be, for example, a liquid crystal display (LCD) or an active matrix organic light emitting diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment, the display 260 may further include a control circuit for controlling the panel 262, the hologram device 264, and the projector 266.

The interface 270 includes, for example, a HDMI 272, a USB 274, an optical interface 276, and a D-subminiature (D-sub) 278. The interface 270 may be included in, for example, the communication module 170 illustrated in FIG. 1A. Additionally or alternatively, the interface 290 may include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the user input module 150 illustrated in FIG. 1A. The audio module 280 processes sound information input or output through, for example, a speaker 282, a receiver 284, an earphone 286, the microphone 288 and the like.

The camera module 291 is a device which may photograph a still image and a video. According to an embodiment, the camera module 291 may include one or more image sensors (e.g., a front sensor or a back sensor), an image signal processor (ISP) (not shown) or a flash (e.g., an LED or xenon lamp).

The power managing module 295 manages power of the electronic device 200. Although not illustrated, the power managing module 295 may include, for example, a power management integrated circuit (PMIC), a charger IC, or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery. The indicator 297 shows particular statuses of the electronic device 200 or a part (e.g., AP 210) of the electronic device 200, for example, a booting status, a message status, a charging status and the like. The motor 298 converts an electrical signal to a mechanical vibration.

Although not illustrated, the electronic device 200 may include a processing unit (e.g., GPU) for supporting a module TV. The processing unit for supporting the mobile TV may process, for example, media data according to a standard of digital multimedia broadcasting (DMB), digital video broadcasting (DVB), media flow and the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 1C:
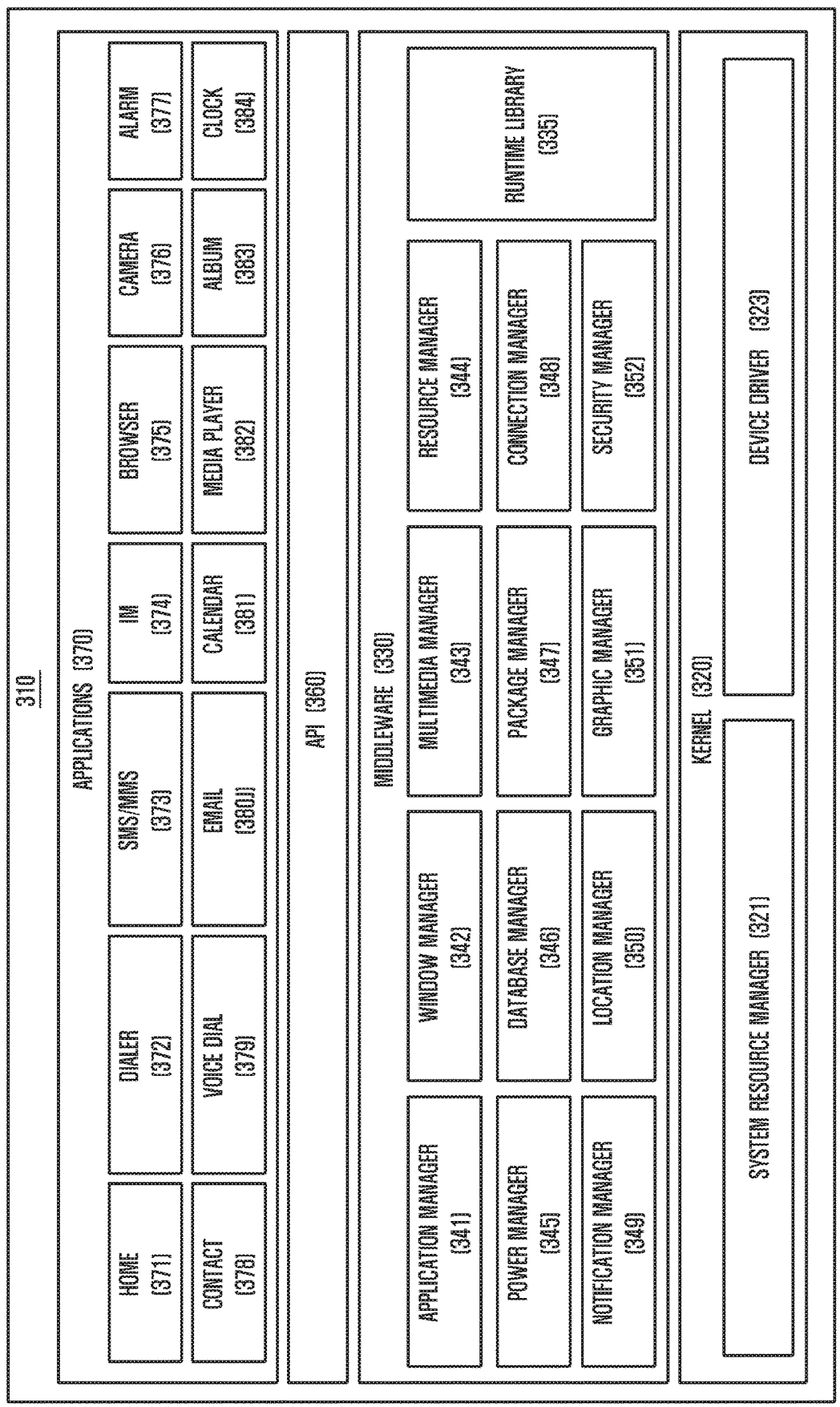
FIG. 1C is a block diagram of a program module according to various embodiments of the present disclosure.

FIG. 1C is a block diagram of a programming module according to an embodiment of the present disclosure. The programming module (e.g., programming module 140) may be included (stored) in the electronic device 100 (e.g., memory 130) illustrated in FIG. 1A. At least some of the programming module may be formed of software, firmware, hardware, or a combination of at least two of software, firmware, and hardware. The programming module may be executed in the hardware (e.g., electronic device 200) to include an OS controlling resources related to the electronic device (e.g., electronic device 100) or various applications (e.g., applications) driving on the OS. For example, the OS may be Android, iOS, Windows, Symbian, Tizen, Bada and the like.

Referring to FIG. 1C, a programming module 310 includes a kernel 320, a middleware 330, an API 360, and applications 370.

The kernel 320 (e.g., kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a BT driver, a shared memory driver, a USB driver, a keypad driver, a WiFi driver, and an audio driver. Further, according to an embodiment, the device driver 323 may include an inter-process communication (IPC) driver. The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 1C, the middleware 300 (e.g., middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a basic input/output system (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm and the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (e.g., electronic device 100 or 200) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of OS to provide a differentiated function. Further, the middleware 330 may dynamically delete some of the components of the related art or add new components. Accordingly, some of the components described in the embodiment of the present disclosure may be omitted, replaced with other components having different names but performing similar functions, or other components may be further included.

The API 360 (e.g., API 145) is a set of API programming functions, and may be provided with a different configuration according to an OS. For example, in Android or iOS, a single API set may be provided for each platform. In Tizen, two or more API sets may be provided. The applications 370, which may include an application similar to the application 134, may include, for example, a preloaded application and/or a third party application. The applications 370 may include a home application 371 a dialer application 372, an SMS/MMS application 373, an instant messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 may be implemented by commands stored in computer-readable storage media. When the commands are executed by at least one processor, e.g. the AP 210, at least one processor may perform functions corresponding to the commands. The computer-readable storage media may be, for example, the memory 230. At least a part of the programming module 310 may be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 300, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 2A:
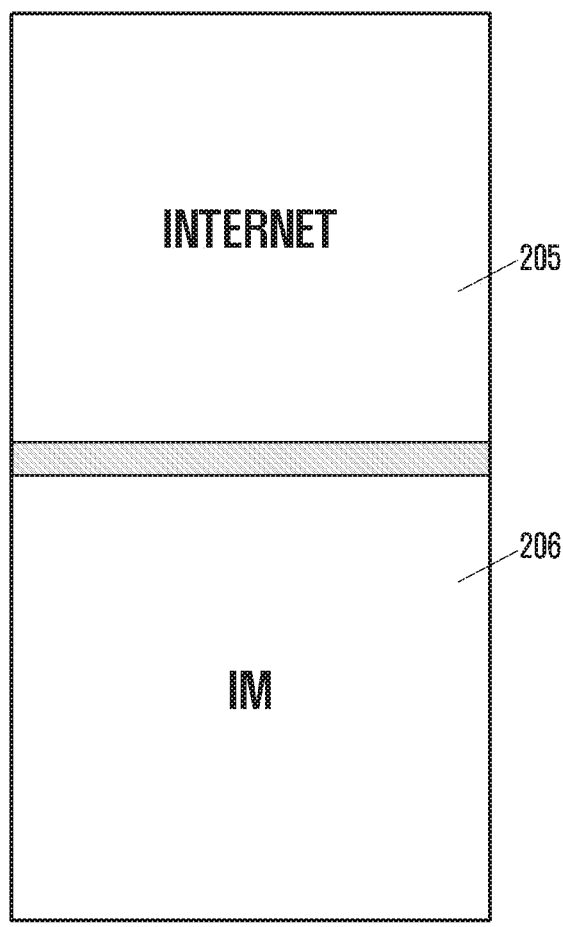
FIGS. 2A and 2B are diagrams illustrating a screen display method of an electronic device according to various embodiments of the present disclosure.
Figure 2B:
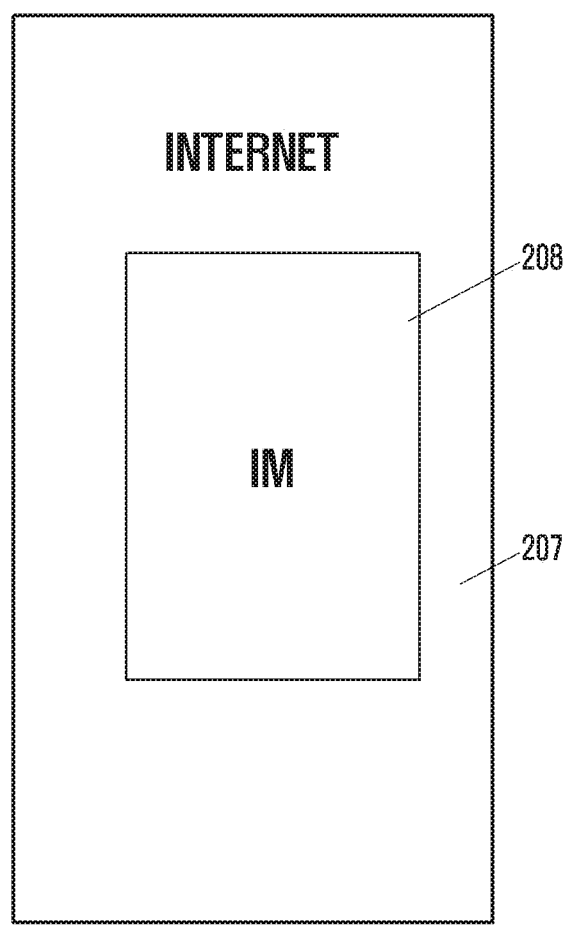

FIGS. 2A and 2B are diagrams illustrating a screen display method of an electronic device according to various embodiments of the present disclosure.

Referring to FIG. 2A, a screen in a case where an electronic device including a touch sensitive display displays a plurality of (e.g., two) application execution screens 205 and 206 through split windows not to be superposed on one another (e.g., split windows). For example, a user may additionally execute an IM application in a state where an internet application execution screen is displayed. Then, one screen may be displayed to be split into different execution regions by at least two windows, and through the executions regions, for example, an internet application execution screen 205 and an instant message application execution screen 206 may be provided, respectively. In this way, the electronic device 100 may simultaneously operate a plurality of applications through two or more split screens.

Referring to FIG. 2B, a screen in a case where an electronic device including a touch sensitive display displays a plurality of (e.g., two) application execution screens 207 and 208 (e.g., popup windows) not to be superposed on one another is illustrated. For example, the user may additionally execute an instant message application in a state where an internet application execution screen is displayed. Then, an instant message application execution screen 208 may be provided through at least a portion of the region where an internet application execution screen 207 is displayed in the state where the internet application execution screen 207 is displayed. For example, the instant message application execution screen 208 may be displayed on at least a portion of the internet application execution screen 207 to be superposed on the at least a portion of the internet application execution screen 207. In this case, in the internet application execution screen 207, a portion corresponding to the instant message application execution screen 208 may be displayed to be hidden by the instant message application execution screen 208 or to penetrate the instant message application execution screen 208.

According to various embodiments of the present disclosure, in the electronic device 100, whether an application execution screen to be additionally executed is displayed to be superposed on an application execution screen under execution or displayed not to be superposed on the application execution screen under execution may be decided by the user's selection. In addition, according to an embodiment, in the electronic device 100, switching from a split window to a popup window or from a popup window to a split window may be performed based on the user input.

Figure 3:
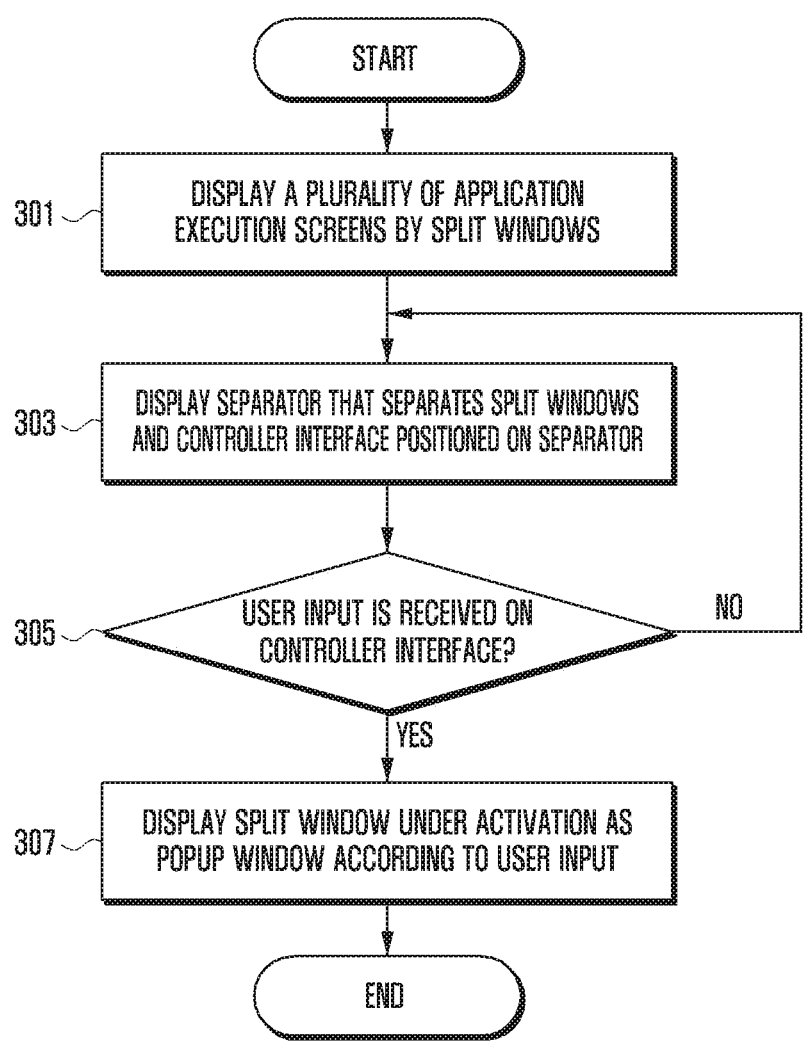
FIG. 3 is a flowchart illustrating a method of performing switching from a split window to a popup window in an electronic device according to an embodiment of the present disclosure.

FIG. 3 is a flowchart illustrating a method of performing switching from a split window to a popup window in an electronic device according to an embodiment of the present disclosure.

Referring to FIG. 3, in operation 301, under the control of the processor 120, the electronic device 100 displays a plurality of application execution screens (e.g., split windows) on the touch sensitive display not to be superposed on one another.

In operation 303, under the control of the processor 120, the electronic device 100 displays a separator that separates one or more execution screens (e.g., split windows) displayed on the touch sensitive display not to be superposed on one another, and a controller interface positioned on the separator.

The separator that separates the one or more screens (e.g., split window) displayed on the touch sensitive display may be a bar-shaped graphical user interface (GUI) element that is positioned between a plurality of split windows. The controller positioned at the center of the separator in default and may be a button type GUI element.

In operation 305, under the control of the processor 120, the electronic device 100 determines whether a user input is received on the controller interface through the touch sensitive display. When the user input is not received on the controller interface, the electronic device 100 returns to operation 303.

For example, the user input is a touch input on the controller interface displayed as a GUI element, and may be at least one of a tap input, a long press input, and a drag and short press input which are input by the user through the touch sensitive display. In addition, the user input may be a hovering input.

When the user input is received on the controller interface, the electronic device 100 proceeds to operation 307. In operation 307, according to the user input under the control of the processor 120, the electronic device 100 switches a split window under activation to a popup window, and displays the popup window on the touch sensitive display. In an embodiment, in operation 307, according to the user input, the electronic device 100 switches an application in a focusing region, to a popup window, and displays the popup window on the touch sensitive display.

In another embodiment, in operation 307, according to the user input under the control of the processor 120, the electronic device 100 switches one or more execution screens (e.g., split windows) displayed on the touch sensitive display not to be superposed on one another, to an execution screen (e.g., popup window) displayed to be superposed on at least a portion of another execution screen and displays the execution screen on the touch sensitive display. For example, when the user drags following a long press on the controller interface, the split window in the direction of moving the drag input may be switched to a popup window and the popup window may be displayed. At this time, a split window around the popup window may be changed to a background window.

For example, according to operation 307 of the electronic device 100, the display position of the application execution screen switched from the split window to the popup window under the control of the processor 120 may be positioned at the touch point where an input is performed so as to change the split window to the popup window.

FIG. 4 is a flowchart illustrating a method of shifting a position of a popup window after a split window is switched to the popup window in an electronic device according to an embodiment of the present disclosure.

Referring to FIG. 4, in operation 401, under the control of the processor 120, the electronic device 100 displays a plurality of application execution screens (e.g., split windows) on the touch sensitive display not to be superposed on one another. In operation 403, under the control of the processor 120, the electronic device 100 displays a separator that separates one or more execution screens (e.g., split windows) displayed on the touch sensitive display not to be superposed on one another, and a controller interface positioned on the separator.

In operation 405, under the control of the processor 120, the electronic device 100 determines whether a first user input is received on the controller interface through the touch sensitive display. When the first user input is not received on the controller interface, the electronic device 100 returns to operation 403.

For example, the user input is a touch input on the controller interface displayed as a GUI element, and may be at least one of a tap input, a long press input, and a drag and short press input which are input by the user through the touch sensitive display. In addition, the user input may be a hovering input.

When the first user input is received on the controller interface, the electronic device 100 proceeds to operation 407. In operation 407, according to the user first input under the control of the processor 120, the electronic device 100 switches a split window under activation to an execution screen (e.g., a popup window) displayed to be superposed on at least a portion of another execution screen, and displays the execution screen on the touch sensitive display.

In another embodiment, in operation 407, according to the first user input, the electronic device 100 switches one or more execution screens (e.g., split windows) displayed on the touch sensitive display not to be superposed on one another, to an execution screen (e.g., popup window) displayed to be superposed on at least a portion of another execution screen and displays the execution screen on the touch sensitive display. For example, when the user drags following a long press on the controller interface, a split window in the direction of moving the drag input may be displayed as a popup window. The electronic device 100 may receive the drag input following the long press as the first user input.

For example, according to operation 407 of the electronic device 100, the display position of the application execution screen switched from the split window to the popup window under the control of the processor 120 may be the same as the position where the first user input is received.

In operation 409, under the control of the processor 120, the electronic device 100 may determine whether a second user input is received through the touch sensitive display.

When the second user input is not received, the electronic device 100 returns to operation 407. When the second user input is received, the electronic device 100 proceeds to operation 411. In operation 411, according to the second user input under the control of the processor 120, the electronic device 100 may shift the display position of the popup window on the touch sensitive display. Here, the first user input and the second user input may be different inputs or the same input.

For example, after the switching to the popup window according to the first user input is performed, when the first user input on the touch sensitive display is released, and then the second user input is input through the touch sensitive display, the electronic device 100 may determine the first user input and the second user input as different inputs.

However, after the switching to the popup window according to the first user input is performed, when the first user input on the touch sensitive display is not released and a touch input (e.g., drag input) is successively received on the touch sensitive display, the electronic device 100 may determine the first user input and the second user input as the same input. At this time, the electronic device 100 may shift the position of the popup window on the touch sensitive display according to the touch and drag input.

FIGS. 5A-5D are diagrams illustrating operation screens of performing switching from a split window to a popup window and shifting operation of the popup window in an electronic device according to an embodiment of the present disclosure.

Figure 5A:
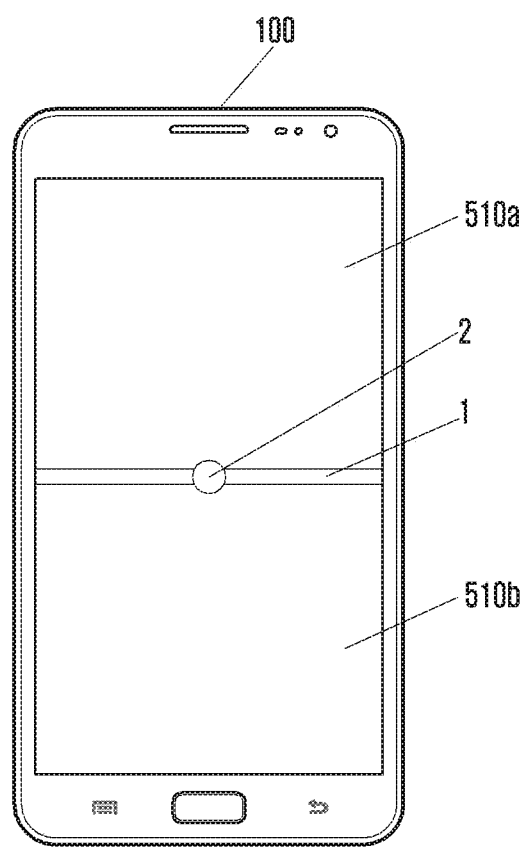
FIGS. 5A, 5B, 5C and 5D are diagrams illustrating operation screens of performing switching from a split window to a popup window and shifting operation of the popup window in an electronic device according to an embodiment of the present disclosure.

Referring to FIG. 5A, the electronic device 100 displays a plurality of application execution screens (e.g., a plurality of split window 510a and 510b) on the touch sensitive display not to be superimposed on one another. The electronic device 100 displays a separator 1 that separates the plurality of split window 510a and 510b and a controller interface 2 on the separator 1.

Figure 5B:
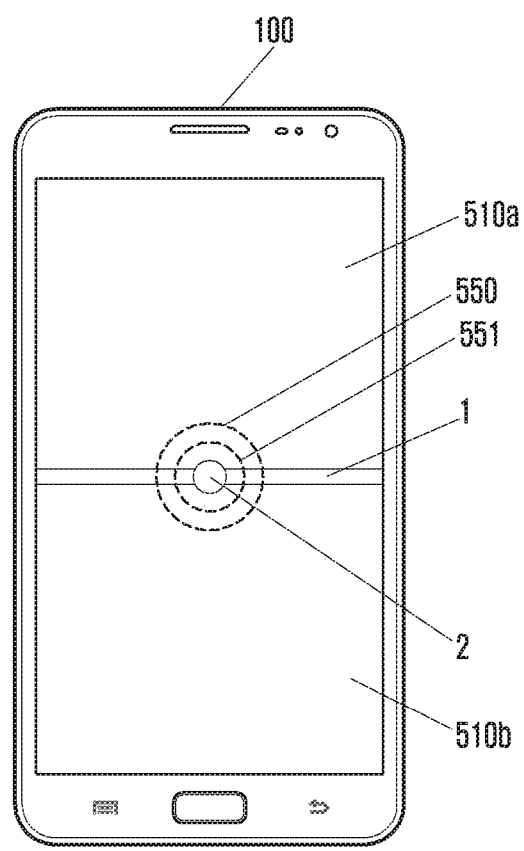

Referring to FIG. 5B, the electronic device 100 receives first user input 550 or 551 on the controller interface 2 through the touch sensitive display. In an embodiment, the first user input 550 may be a touch input having no directionality. The first user input 550 having no directionality may cause a split window 510b under activation to be switched to an execution screen (e.g., the popup window 520) displayed to be superposed on at least a portion of another execution screen so that the execution screen may be displayed on the touch sensitive display. In another embodiment, the first user input 551 may be a touch input having directionality. The first user input 551 having directionality may cause the split window 510b to be switched to a popup window 520 so that the popup window 520 may be displayed on the touch sensitive display. Among the plurality of split windows, a split window 510a that is not changed to popup window may be extended to the region 510b changed to the popup window and displayed.

Figure 5C:
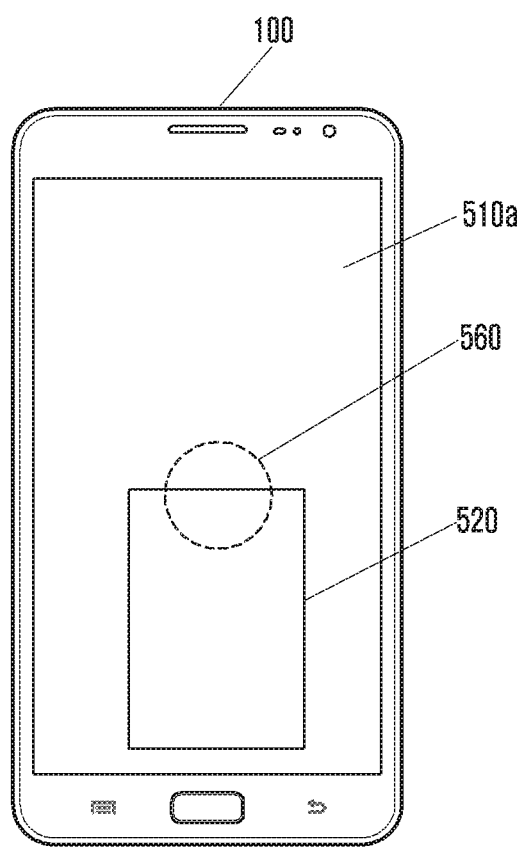

Referring to FIG. 5C, according to a first user input 550, the electronic device 100 switches the split window 510b under activation to a popup window 520 and displays the popup window 520 on the touch sensitive display. The application execution screen, switched from the split window 510b to the popup window 520, may be located at the position where the first user input 550 is received.

Figure 5D:
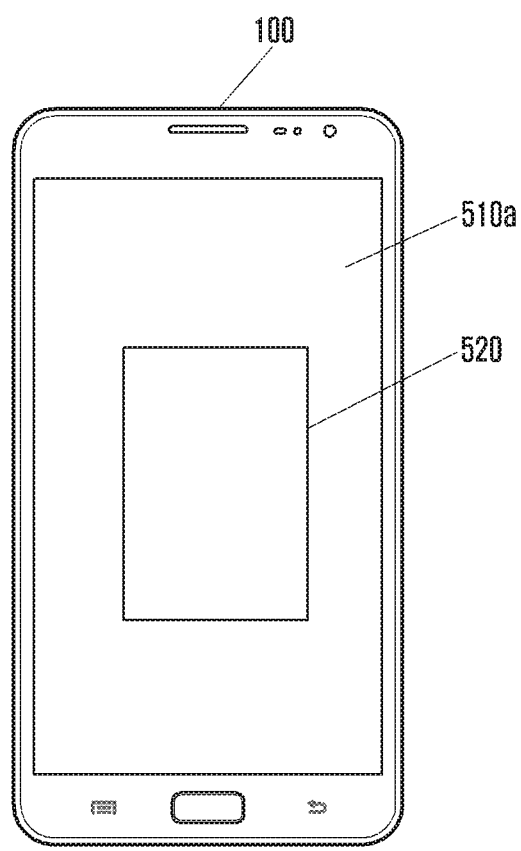

Referring to FIG. 5D, the electronic device 100 may shift the position of the popup window 520 according to the second user input 560.

For example, the first and second user inputs may be touch inputs on the controller interface displayed as a GUI element, and may be at least one of a tap input, a long press input, a drag and short press input which are input by the user through touch sensitive display. In addition, the first and second user inputs may be hovering inputs.

Figure 6A:
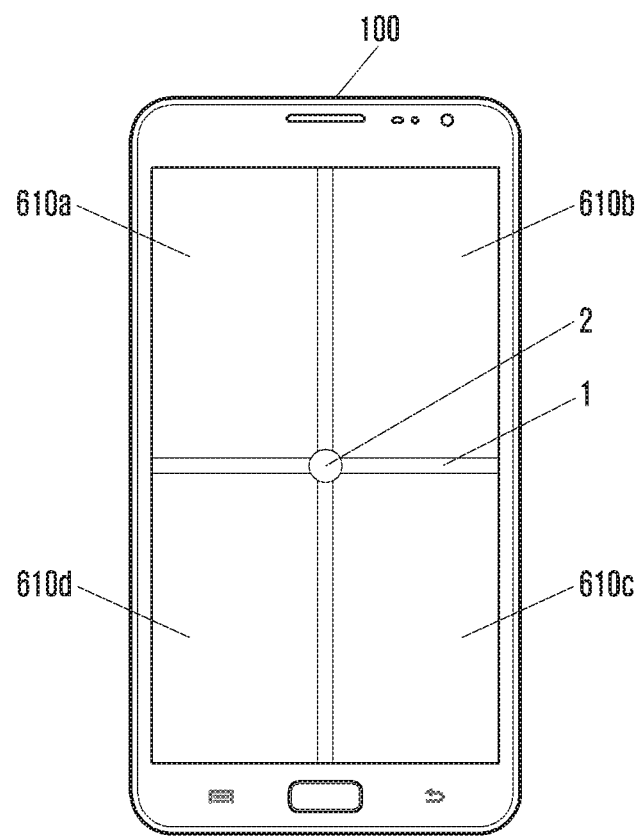
FIGS. 6A, 6B and 6C are diagrams illustrating operation screens of performing switching from a split window to a popup window in an electronic device according to an embodiment of the present disclosure.
Figure 6B:
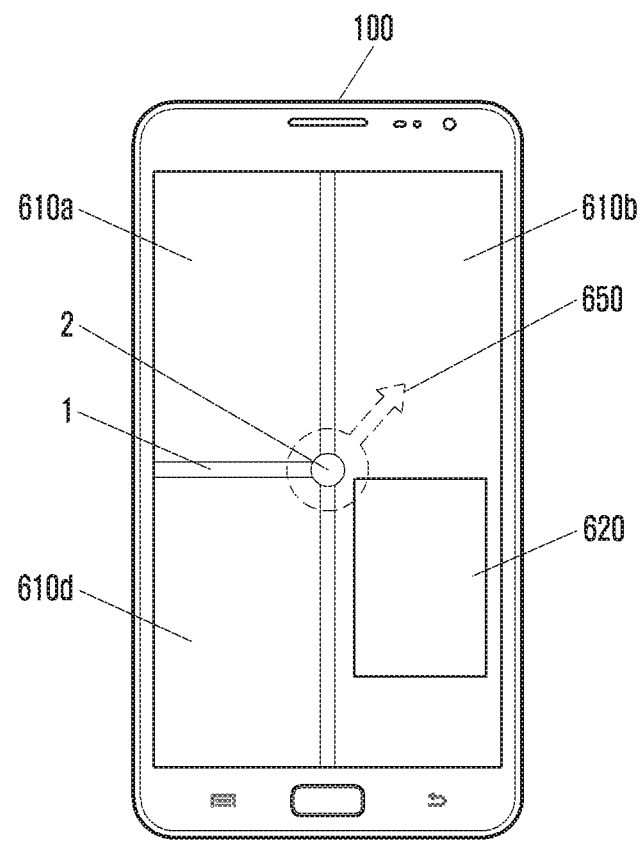
Figure 6C:
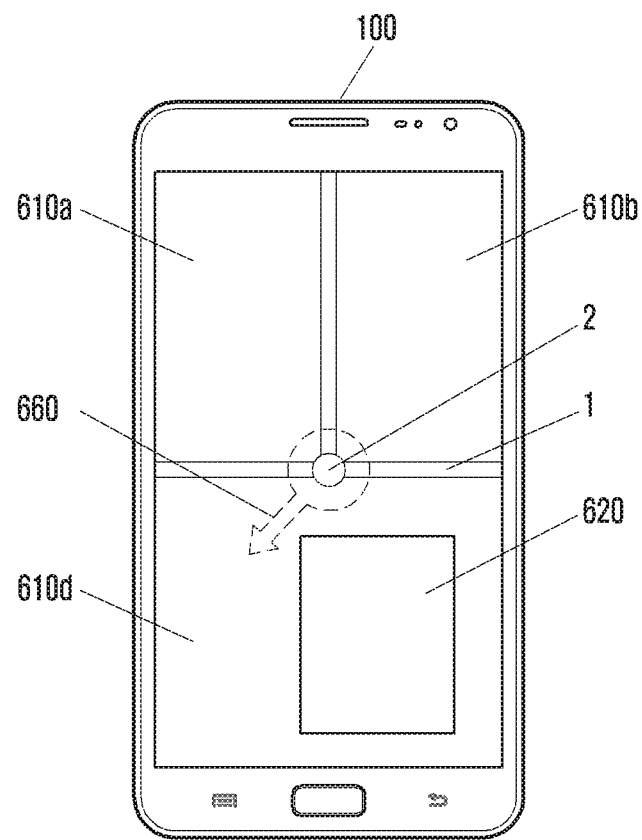

FIGS. 6A-6C are diagrams illustrating operation screens of performing switching from a split window to a popup window in an electronic device according to an embodiment of the present disclosure.

Referring to FIG. 6A, the electronic device 100 displays a plurality of application execution screens (e.g., a plurality of split windows 610a, 610b, 610c, and 610d)) not to be superposed on one another on the touch sensitive display. The electronic device 100 displays a separator 1 that separates the plurality of split windows 610a, 610b, 610c, and 610d and a controller interface 2 positioned at the center of the separator 1.

Referring to FIG. 6B, when a user input 650 directed to the application execution screen 610b of the right upper end among the plurality of application execution screens 610a, 610b, 610c, and 610d on the controller interface 2 through the touch sensitive display, the electronic device 100 switches the split window 610c under activation to a popup window 620 and displays the popup window 620 on the touch sensitive display. The application execution screen 610b of the right upper end is extended to the split window 610c region changed to an execution screen (e.g., popup window 620) displayed to be superposed on at least a portion of the split window 610c.

In another embodiment, when the user shifts the user input 650 toward the application execution screen 610b of the right upper end, the split window 610b in the direction of shifting the user input 650 may be displayed as the popup window 620. At this time, the split window 610c around the popup window 620 may be changed to a background window.

Referring to FIG. 6C, when a user input 660 directed toward the application execution screen 610d of the left lower end among the plurality of application execution screens 610a, 610b, 610c, and 610d is received on the controller interface 2 through the touch sensitive display, the electronic device 100 switches the split window 610c under activation to a popup window 620 and displays the popup window 620 on the touch sensitive display. The application execution screen 610d of the left lower end is extended to the split window 610c region changed to the popup window 620.

Referring to FIG., when the user shifts the user input 660 toward the application execution screen 610d of the left lower end, the split window 610d in the direction of shifting the user input 660 may be displayed as a popup window 620. At this time, the split window 610c around the popup window 620 may be changed to a background window.

FIG. 7 is a flowchart illustrating a method of performing switching from a popup window to a split window in an electronic device according to an embodiment of the present disclosure.

Referring to FIG. 7, in operation 701, the electronic device 100 displays at least one application execution screen by an execution screen (e.g., popup window) displayed to be superimposed on at least a portion on the touch sensitive display under the control of the processor 120.

For example, in operation 701 of the electronic device 100, at least one popup window, in which an application execution screen is displayed, may be displayed on the touch sensitive display.

In operation 703, under the control of the processor 120, the electronic device 100 determines whether a user input is received through the touch sensitive display. In an embodiment, the user input is a user input for shifting the popup window, which may be a touch and drag input on the popup window. When the touch and drag input is received on the GUI element displayed as the popup window, the electronic device 100 may display the shift of the popup window on the touch sensitive display.

When the user input is not received, the electronic device 100 returns to operation 701, and when the user input is received, the electronic device 100 proceeds to operation 705.

In operation 705, the electronic device 100 shifts and displays the popup window on the touch sensitive display according the user input under the control of the processor 120.

In operation 707, the electronic device 100 determines whether an execution screen (e.g., popup window) displayed to be superposed on at least a portion of a shifted region is shifted to a switching region (e.g., docking region), in which the execution screen may be switched to one or more execution screens (e.g., split windows) displayed on the touch sensitive display not to be superposed on one another. For example, the docking region may be a boundary region of the touch sensitive display. The docking region may be formed in a predetermined region of the boundary of the touch sensitive display. The docking region may be formed in a predetermined region at upper, lower, left, and right sides of the touch sensitive display.

When the shifted popup window is not shifted to the docking region, the electronic device 100 returns to operation 705, and when it is determined that the shifted popup window is shifted to the docking region, the electronic device 100 proceeds to operation 709.

In operation 709, under the control of the processor 120, the electronic device 100 displays a docking guide on the touch sensitive display. The docking guide is a GUI element that indicates the shifted popup window is positioned in the docking region and notifies in advance the user of a position where the popup window is to be changed to split window. For example, when the shifted popup window is positioned in the docking region, the electronic device 100 may display the popup window in a state where the popup window is changed to a translucent or transparent split window.

In operation 711, under the control of the processor 120, the electronic device 100 determines whether the popup window shifted to the docking region has stopped shift for a predetermined length of time. In other words, in operation 711, under the control of the processor 120, the electronic device 100 determines whether the shifted popup window has stayed in the docking region for the predetermined length of time.

When it is determined that the shifted popup window has not stayed in the docketing region for the predetermined length of time, the displayed docking guide disappears and the electronic device 100 returns to operation 705. When it is determined that the popup window has stayed in the docking region for the predetermined length of time, the electronic device 100 proceeds to operation 713.

In operation 713, under the control of the processor 120, the electronic device 100 switches the popup window to a split window, and displays the split window on the touch sensitive display. For example, when the shifted popup window has stayed in the docking region for the predetermined length of time, the electronic device 100 may switch the docking guide from a form of a translucent or transparent split window to a form of an opaque split window, and display the split window.

FIGS. 8A-8D are diagrams illustrating operation screens of performing switching from a popup window to a split window in an electronic device according to an embodiment of the present disclosure.

Figure 8A:
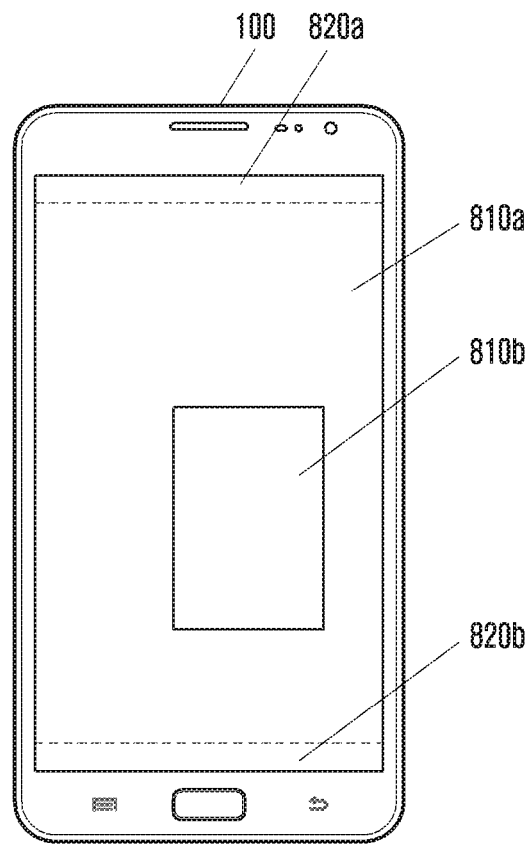
FIGS. 8A, 8B, 8C, 8D, 9A, 9B, 9C and 9D are diagrams illustrating operation screens of performing switching from a popup window to a split window in an electronic device according to an embodiment of the present disclosure.

Referring to FIG. 8A, the electronic device 100 may display a first application execution screen as a whole screen 810a on the touch sensitive display, and display a second application execution screen as an execution screen (e.g., popup window 810b) displayed to be superposed on at least a portion of the whole screen 810a. In the upper and lower boundary regions of the touch sensitive display of the electronic device 100, there are switching regions (e.g., docking regions 820a and 820b), in which an execution screen (e.g., popup window) displayed to be superposed on at least a non-displayed portion may be switched to one or more execution screens (e.g., split windows) displayed on the touch sensitive display not to be imposed on one another.

Figure 8B:
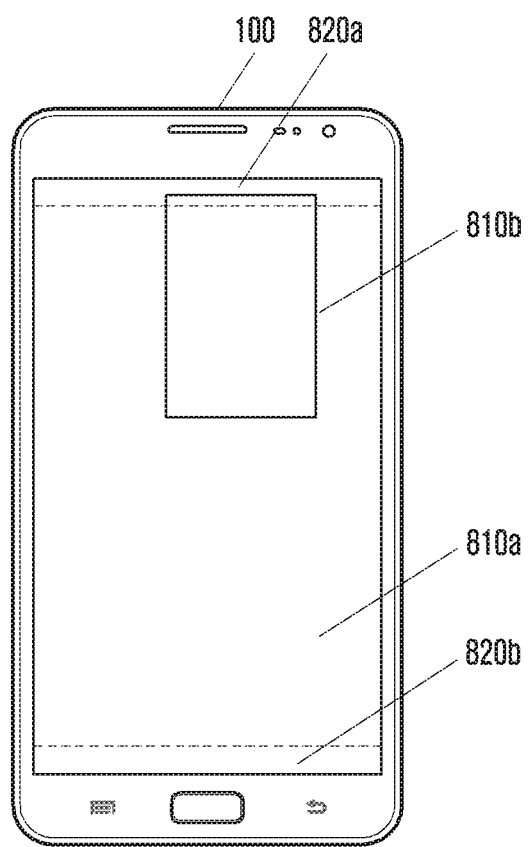

Referring to FIG. 8B, the popup window 810b may be shifted to the docking region 820a.

Figure 8C:
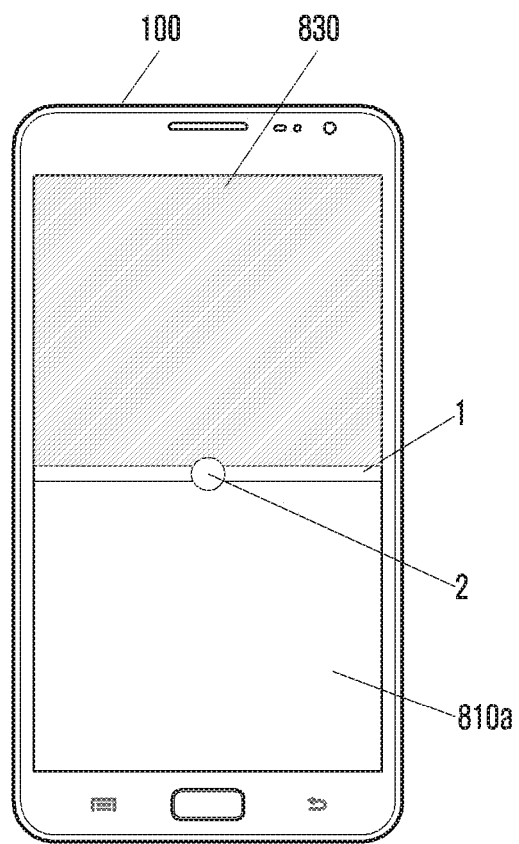

Referring to FIG. 8C, when the popup window 810b is positioned in the docking region 820a, a docking guide 830 may be displayed. When the docking guide 830 is displayed, a separator 1 and a controller interface 2 may be displayed together with the docking guide 830. The docking guide 830 is a GUI element that indicates that the shifted popup window 810b is positioned in the docking region 820a and notifies in advance the user of a point where the popup window 810b is to be changed to a split window 840. For example, when the shifted popup window 810b is positioned in the docking region 820a, the electronic device 100 may change the popup window 810b to one or more translucent or transparent execution screens (e.g., split window 830) displayed not to be superposed on one another, and display the execution screens on the touch sensitive display.

Figure 8D:
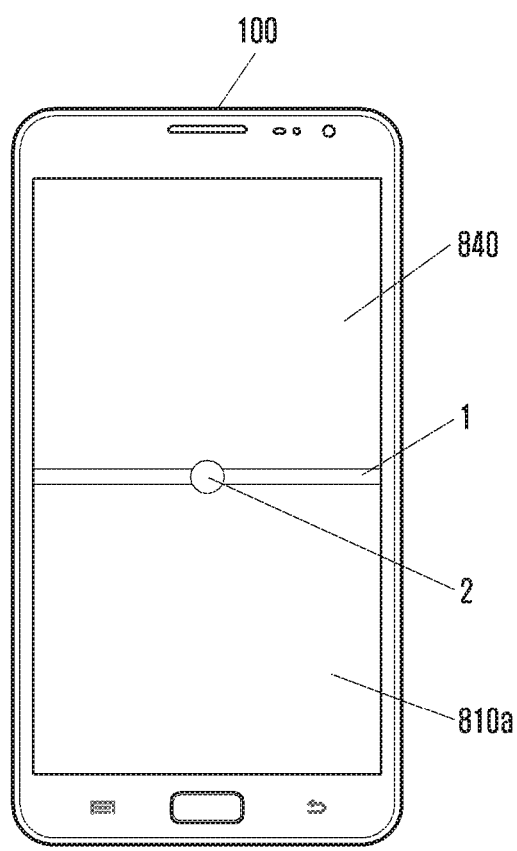

Referring to FIG. 8D, when the shifted popup window 810b has stayed in the docking region 820a for a predetermined length of time, the docking guide 830 in the form of the translucent or transparent split window may be shifted to an opaque split window 840 so that the opaque split window 840 may be displayed.

When the shifted popup window 810b has not stayed in the docking region 820a for the predetermined length of time, the displayed docking guide disappears and switching from the screen of FIG. 8C to the screen of FIG. 8B is performed.

FIGS. 9A-9D are diagrams illustrating operation screens of performing switching from a popup window to a split window in an electronic device according to an embodiment of the present disclosure.

Figure 9A:
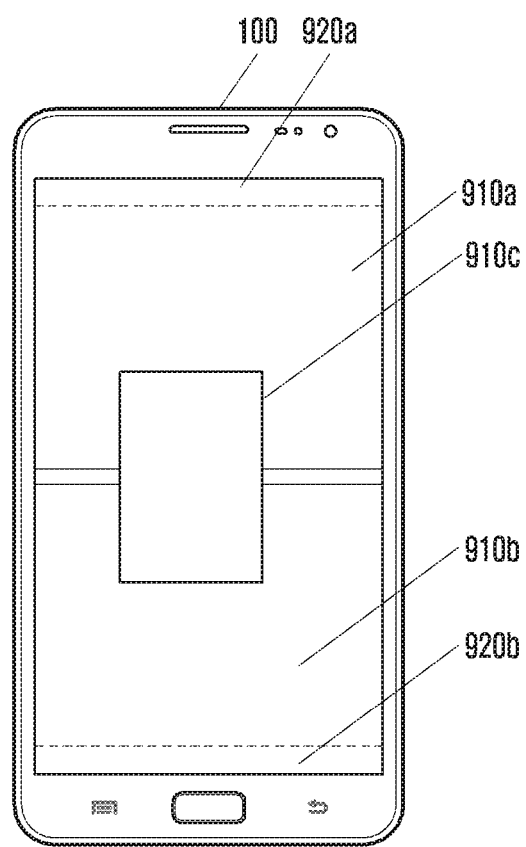

Referring to FIG. 9A, the electronic device 100 may display, on the touch sensitive display, a first application execution screen as a first split window 910a, a second application execution screen as a second split window 910b, and a third application execution screen as a popup window 910c. In the upper and lower boundary regions of the electronic device 100, there are non-displayed docking regions 920a and 920b.

Figure 9B:
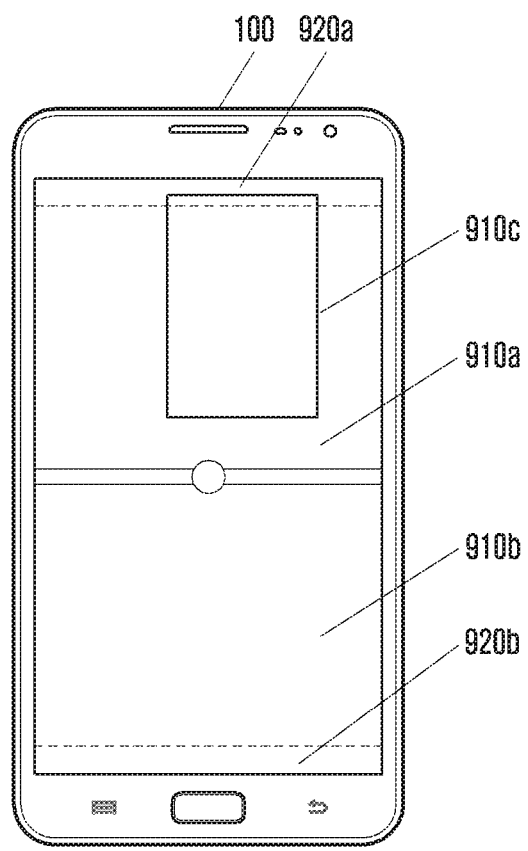

Referring to FIG. 9B, the popup window 910c may be shifted to the docking region 920a according to a user input.

Figure 9C:
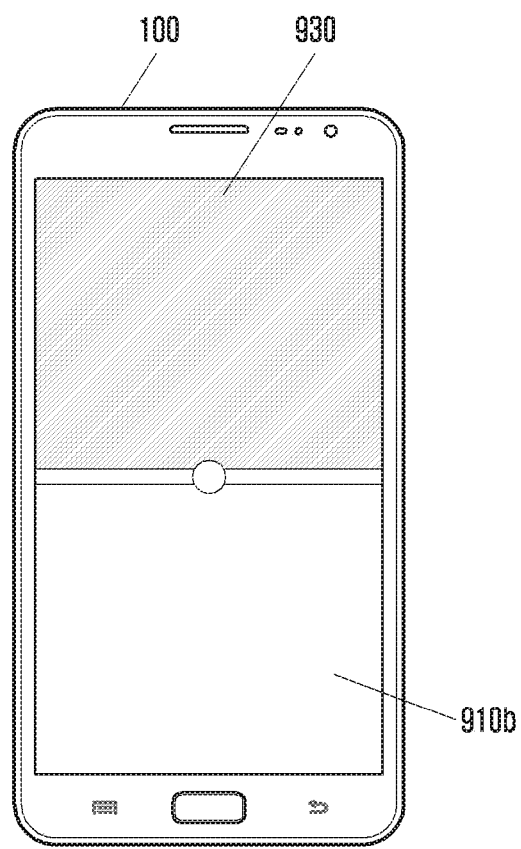

Referring to FIG. 9C, when the shifted popup window 910c is positioned in the docking region 920a, a docking guide 930 may be displayed. The docking guide 930 is a GUI element that indicates that the shifted popup window 910c is positioned in the docking region 920a and notifies the use of the position where the popup window 910c is to be changed to a split window 940 of FIG. 9D. For example, when the shifted popup window 910c is positioned in the docking region 920a, the electronic device 100 may change the popup window 910c to a translucent or transparent split window 930 and display the split window 930.

Figure 9D:
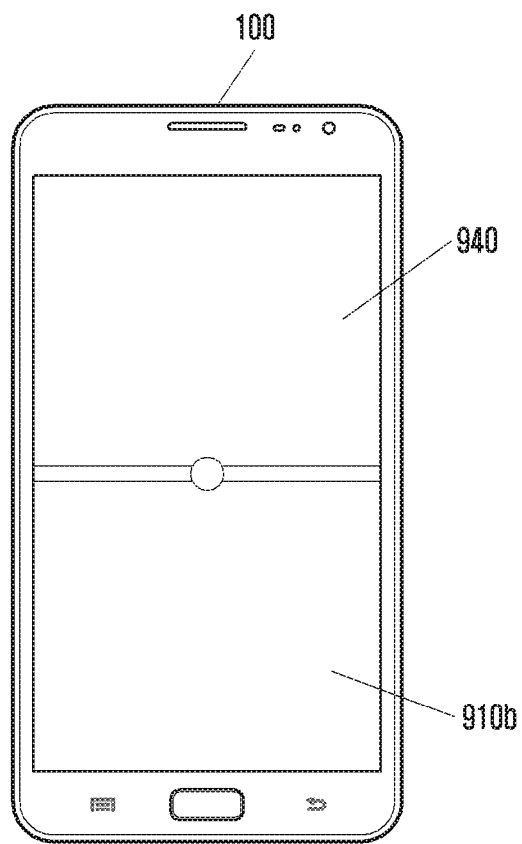

Referring to FIG. 9D, when the shifted popup window 910c has stayed in the docking region 920a for a predetermined length of time, the electronic device 100 may switch the docking guide 930 in the form of the translucent or transparent split window to an opaque split window 940 and display the split window 940. The region of the switched split window 940 is the same as that of the first split window 910a, and the first application that has been executed in the first split window 910a may be terminated or executed in the background of the switched split window 940. In the foreground of the switched split window 940, a third application execution screen is displayed.

When the shifted popup window 910*c* has not stayed in the docking region 920*a* for the predetermined length of time, the displayed docking guide disappears and the screen of FIG. 9C is switched to the screen of FIG. 9B.

Figure 10:
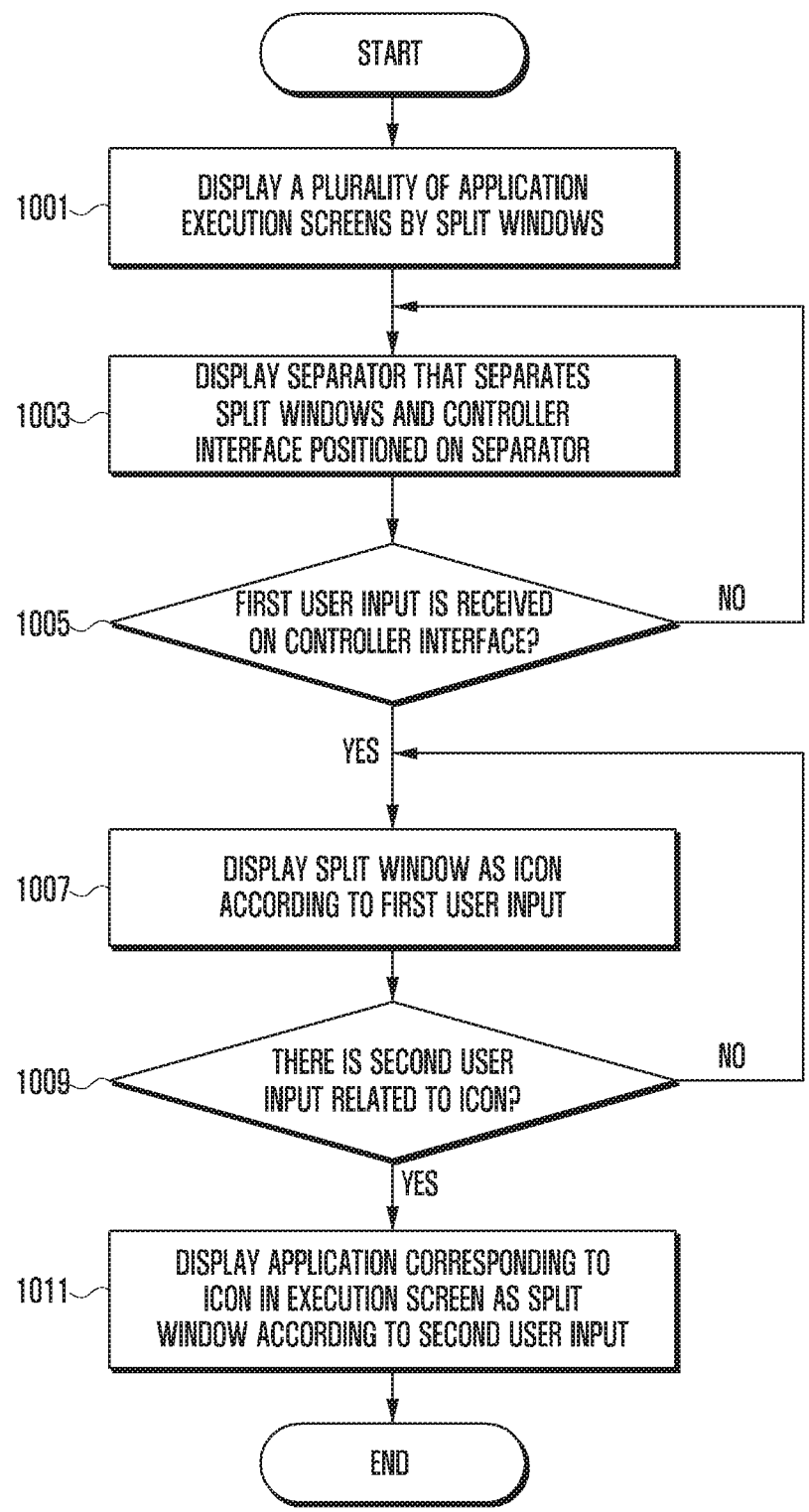
FIG. 10 is a flowchart illustrating a switching method between a split window and an icon in an electronic device according to an embodiment of the present disclosure.

FIG. 10 is a flowchart illustrating a method of performing switching between a split window and an icon in an electronic device according to an embodiment of the present disclosure.

Referring to FIG. 10, in operation 1001, under the control of the processor 120, the electronic device 100 displays a plurality of application execution screens (e.g., a plurality of split windows)) on the touch sensitive display not to be superposed on one another.

In operation 1003, under the control of the processor 120, the electronic device 100 displays a separator that separates the plurality of application execution screens (e.g., the plurality of split windows) not to be superposed on one another, and a controller interface positioned on the separator on the touch sensitive display.

In operation 1005, under the control of the processor 120, the electronic device 100 determines whether a first user input is received on the controller interface through the touch sensitive display. When the first user input is not received on the controller interface, the electronic device 100 returns to operation 1003.

For example, the first user input is a touch input on the controller interface displayed as a GUI element, and may be a touch and drag input that is input by the user through the touch sensitive display. In another embodiment, the first user input may be a hovering input.

When the first user input is received on the controller interface, the electronic device 100 may proceed to operation 1007. In operation 1007, according to the first user input under the control of the processor 120, the electronic device 100 switches the split window to an icon, and displays the icon on the touch sensitive display. The icon (graphical symbol) may be a representative image of an application which is being executed on a split window.

For example, when the first user input (e.g., touch and drag) is received on the controller interface, the split window is gradually reduced in size, and when the split window is shifted by a predetermined distance or more, the split window disappears and is displayed as an icon. The position where the icon is displayed may be displayed in a shifting direction of the first user input and the lower end of the touch sensitive display.

In operation 1009, under the control of the processor 120, the electronic device 100 determines whether a second user input for the icon is received through the touch sensitive display.

When the second user input for the icon is not received, the electronic device 100 returns to operation 1007. When the second user input for the icon is received, the electronic device 100 proceeds to operation 1011.

In operation 1011, according to the second user input under the control of the processor 120, the electronic device 100 may display an application execution screen corresponding to the icon by a split window.

For example, the second user input is a touch input on the icon displayed as a GUI element, and may be at least one of a tap input, a long press input, and a drag and short press input which are input by the user through the touch sensitive display. In addition, the second user input may be a hovering input.

Figure 11A:
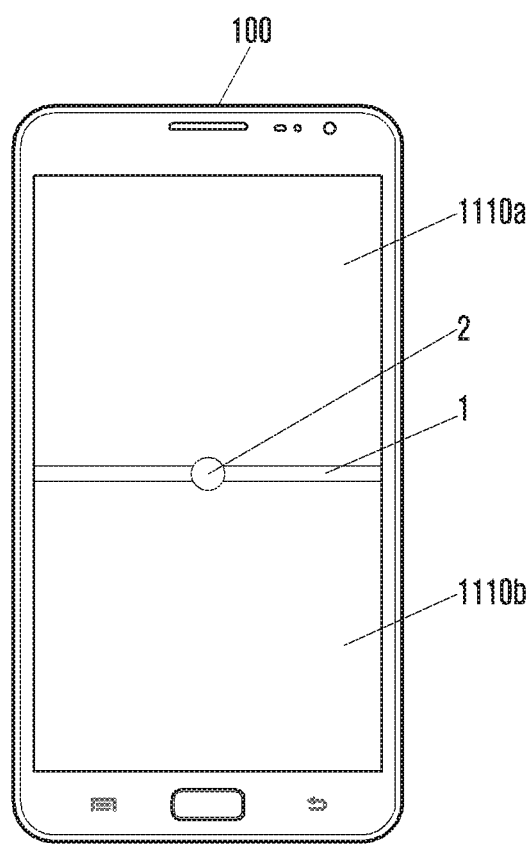
FIGS. 11A, 11B, and 11C are diagrams illustrating operation screens of performing switching between a split window and an icon in an electronic device according to an embodiment of the present disclosure.
Figure 11B:
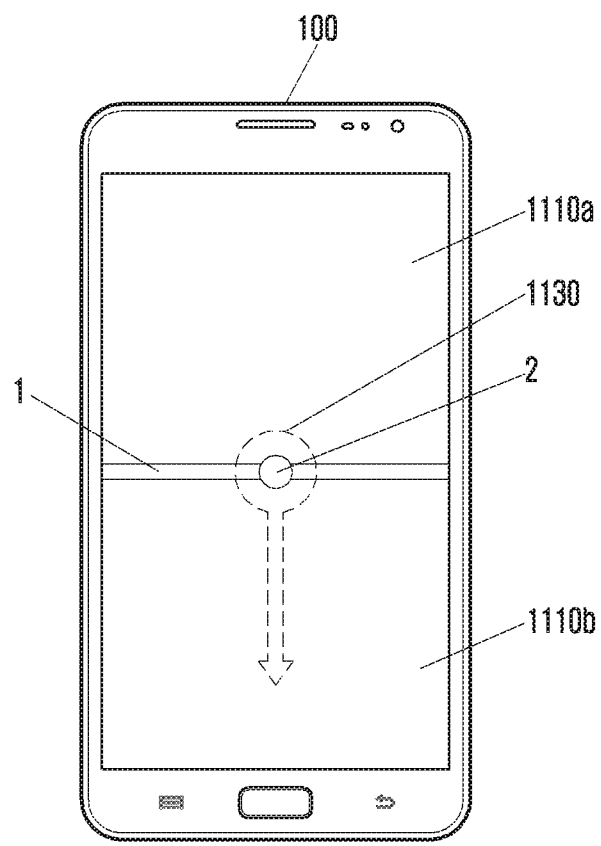
Figure 11C:
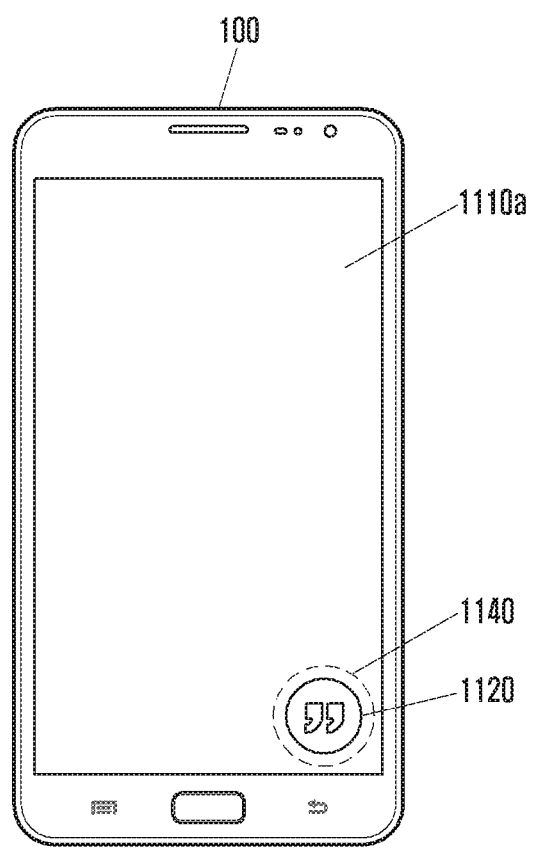

FIGS. 11A-11C are diagrams illustrating operation screens of performing switching between a split window and an icon in an electronic device according to an embodiment of the present disclosure.

Referring to FIG. 11A, the electronic device 100 displays a plurality of application execution screens (e.g., a plurality of split windows 1110*a* and 1110*b*) on the touch sensitive display not to be superposed on one another. The electronic device 100 displays a separator 1 that separates the plurality of split windows 1110*a* and 1110*b*, and a controller interface 2 positioned on the separator 1.

Referring to FIG. 11B, the electronic device 100 receives a first user input 1130 on the controller interface 2 through the touch sensitive display. The first user input 1130 is a touch input on the controller interface displayed as a GUI element, and may be a touch and drag input that is input by the user through the touch sensitive display. In another embodiment, the first user input may be a hovering input.

Referring to FIG. 11C, the electronic device 100 switches a split window 1110*b*, which is being activated according to the first user input 1130 or is in the drag input direction, to an icon 1120 and displays the icon 1120 on the touch sensitive display. The icon (graphical symbol) may be a representative image of an application that is being executed in the split window.

For example, when the first user input (e.g., touch and drag input 1130) is received on the controller interface, the electronic device 100 may gradually reduce the size of the split window 1110*b*, and when the first user input is shifted by a predetermined distance or more, the split window may disappear and the icon 1120 may be displayed. The position where the icon is displayed may be in the shifting direction of the first user input 1130, or the icon may be displayed on the lower end of the touch sensitive display. At this time, the split window 1110*a*, in which the first user input 1130 is not received, may be switched to a whole screen and the whole screen may be displayed.

In another embodiment, when a second user input 1140 for the icon 1120, an application related to the icon 1120 may be executed and displayed on the split window 1110*b* as in the screen of FIG. 11A.

Figure 12:
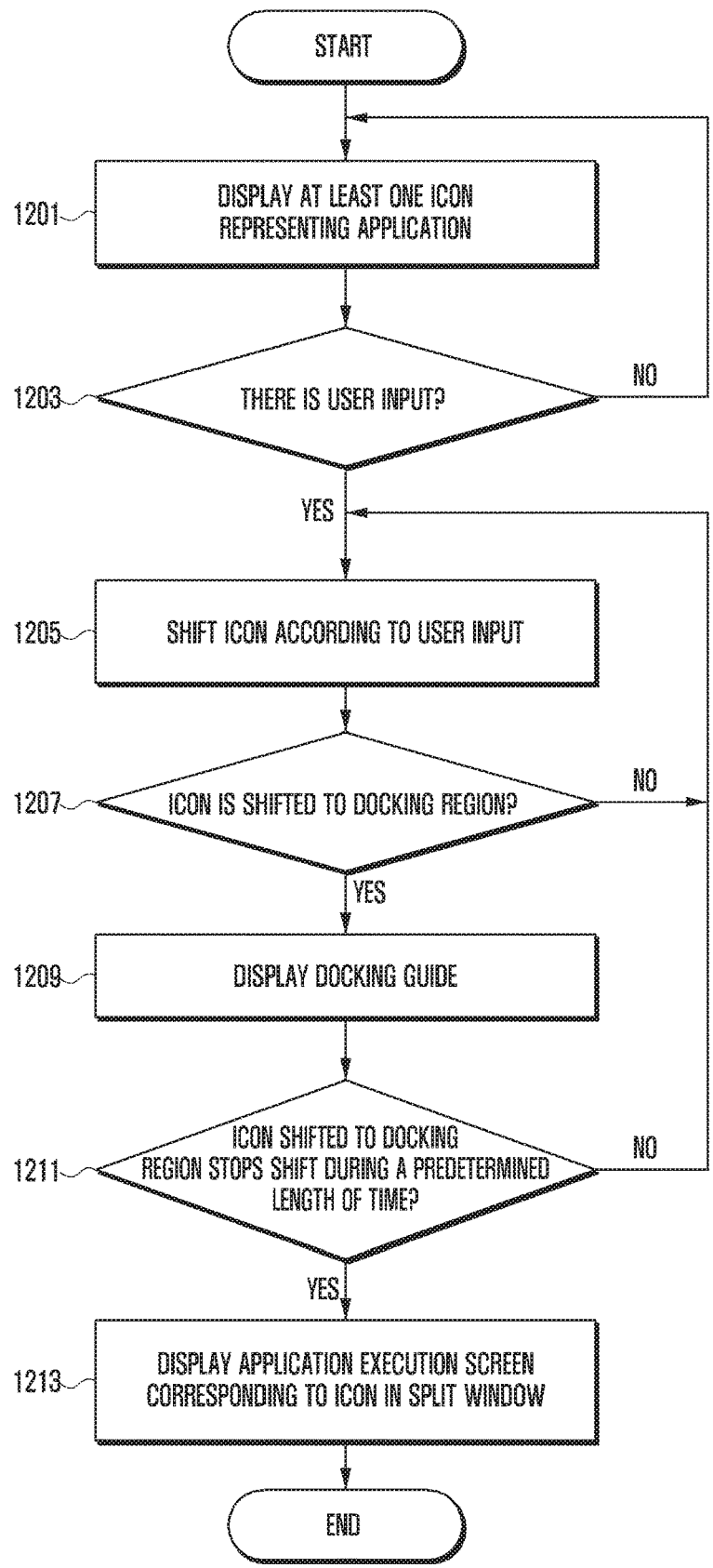
FIG. 12 is a flowchart illustrating a switching method between a split window and an icon in an electronic device according to an embodiment of the present disclosure.

FIG. 12 is a flowchart illustrating a switching method between a split window and an icon in an electronic device according to an embodiment of the present disclosure.

Referring to FIG. 12, in operation 1201, under the control of the processor 120, the electronic device 100 may display at least one icon representing an application on the touch sensitive display.

In operation 1203, under the control of the processor 120, the electronic device 100 determines whether a user input is received through the touch sensitive display. In an embodiment, the user input is a user input for shifting the icon that may be a touch and drag input for the icon. When a touch and drag input for a GUI element displayed as the icon, the electronic device 100 may display shift of the icon on the touch sensitive display.

When the user input is not received, the electronic device 100 returns to operation 1201, and when the user input is received, the electronic device 100 proceeds to operation 1205.

In operation 1205, according to the user input under the control of the processor 120, the electronic device 100 shifts and displays the icon on the touch sensitive display.

In operation 1207, the electronic device 100 determines whether the shifted icon is shifted to a switching region (e.g., docking region), in which one or more shifted icons may be switched to one or more execution screens (e.g., split window) displayed on the touch sensitive display not to be superimposed on one another. For example, the docking region may be a boundary region of the touch sensitive display. The docking region may be formed in a predetermined region of a boundary of the touch sensitive display. The docking region may be formed in a predetermined region at the upper, lower, left, or right side of the touch sensitive display.

When the shifted icon is not shifted to the docking region, the electronic device 100 returns to operation 1205, and when it is determined that the shifted icon is shifted to the docking region, the electronic device 100 proceeds to operation 1209.

In operation 1209, under the control of the processor 120, the electronic device 100 displays a docking guide on the touch sensitive display. The docking guide is a GUI element that indicates that the shifted icon is positioned in the docking region, and notifies, in advance, the user of the position where the icon is to be changed to a split window. For example, when the shifted icon is positioned in the docking region, the electronic device 100 may change the icon to a translucent or transparent split window and display the translucent or transparent split window.

In operation 1211, under the control of the processor 120, the electronic device 100 determines whether the icon shifted to the docking region has stopped the shift for a predetermined length of time. In other words, in operation 1211, under the control of the processor 120, the electronic device 100 determines whether the shifted icon has stayed in the docking region for the predetermined length of time.

When it is determined that the shifted icon has not stayed in the docking region for the predetermined length of time, the displayed docking guide disappears and the electronic device 100 returns to operation 1205. When it is determined the shifted icon has stayed in the docking region for the predetermined length of time, the electronic device 100 proceeds to operation 1213.

In operation 1213, under the control of the processor 120, the electronic device 100 switches the icon to a split window and displays the split window on the touch sensitive display. For example, when the shifted icon has stayed in the docking region for the predetermined length of time, the electronic device 100 may convert the docking guide in the form of a translucent or transparent split window in the form of an opaque split window, and display the split window.

Figure 13:
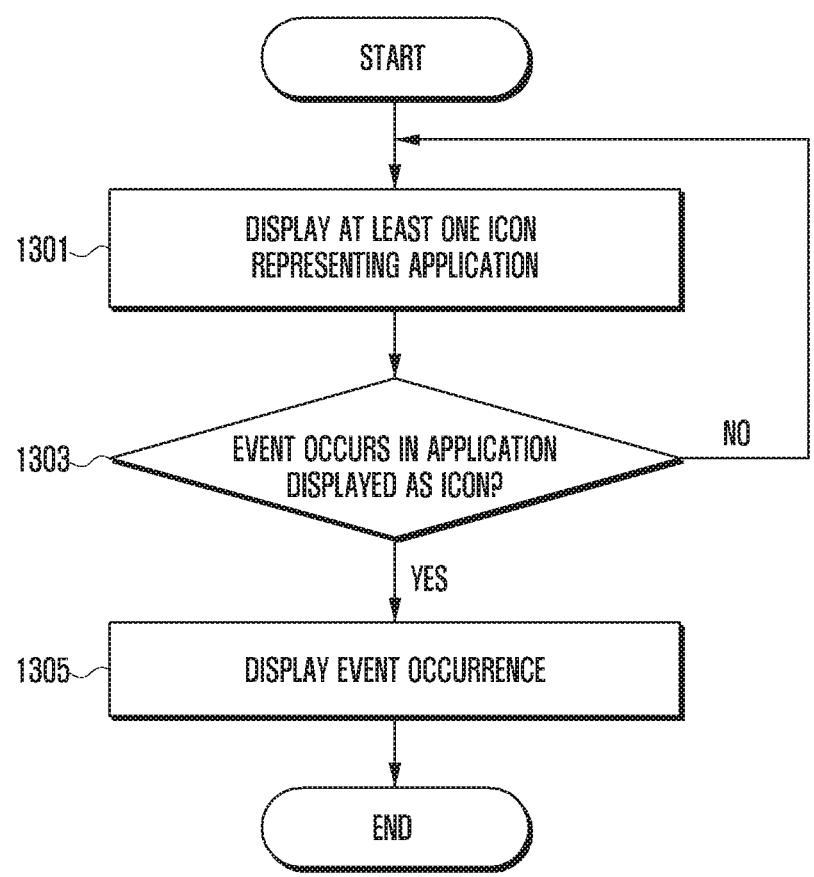
FIG. 13 is a flowchart illustrating an event notification occurrence of an application displayed as an icon in an electronic device according to an embodiment of the present disclosure.

FIG. 13 is a flowchart illustrating event notification occurrence of an application displayed as an icon in an electronic device according to an embodiment of the present disclosure.

Referring to FIG. 13, in operation 1301, the electronic device 100 displays at least one icon that represents an application on the touch sensitive display under the control of the processor 120.

In operation 1303, the electronic device 100 determines whether an event has occurred in the application displayed as the icon. The event may be, for example, message reception, push event occurrence, alarm, or notification.

When it is determined that no event has occurred, the electronic device 100 returns to operation 1301. When it is determined that an event has occurred, the electronic device 100 proceeds to operation 1305.

In operation 1305, the electronic device 100 displays event occurrence on the touch sensitive display under the control of the processor 120. For example, when the event occurs, the electronic device 100 may notifies the user of the event occurrence in the manner of displaying the icon to flicker or displaying event contents in a given region. When the event contents are displayed in the given region, the event contents may be displayed as a translucent or transparent dimming window.

Figure 14A:
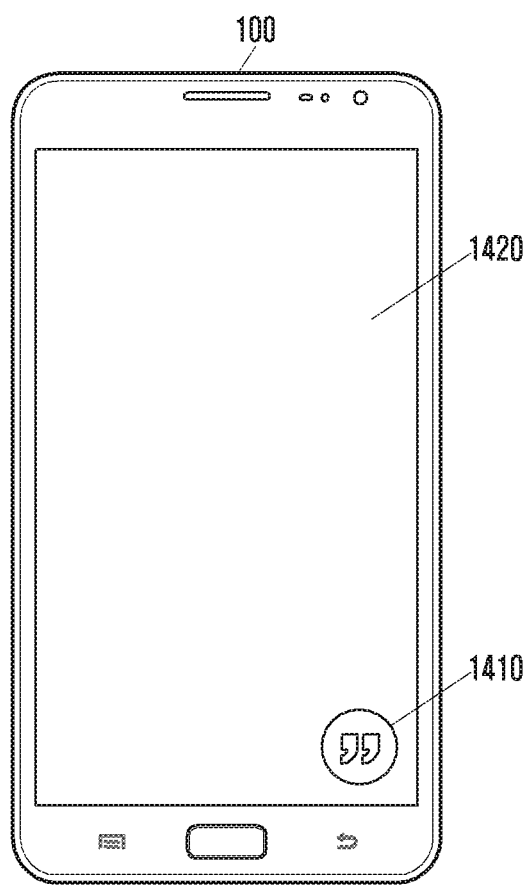
FIGS. 14A and 14B are diagrams illustrating an operation screen indicating an event notification occurrence of an application displayed as an icon in an electronic device according to an embodiment of the present disclosure.
Figure 14B:
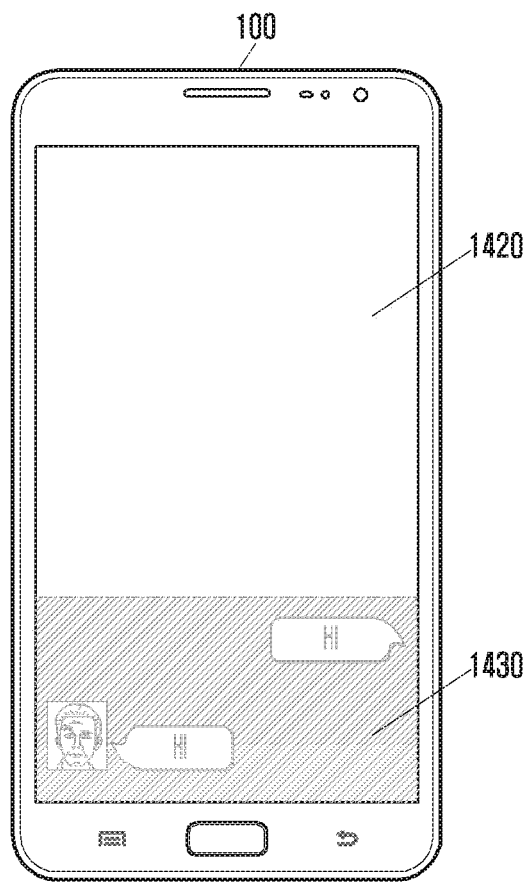

FIGS. 14A and 14B are diagrams illustrating an operation screen indicating event notification occurrence of an application displayed as an icon in and electronic device according to an embodiment of the present disclosure.

Referring to FIG. 14A, the electronic device 100 may display an icon 1410 on a whole screen 1420 which is being executed on the touch sensitive display.

Referring to FIG. 14B, when an event occurs in the application displayed as the icon 1410, the electronic device 100 may notify the user of the event occurrence in the manner of displaying event contents in a given region 1430. When the event contents are displayed in the given region, the event contents may be displayed as a translucent or transparent dimming window 1430.

Figure 15:
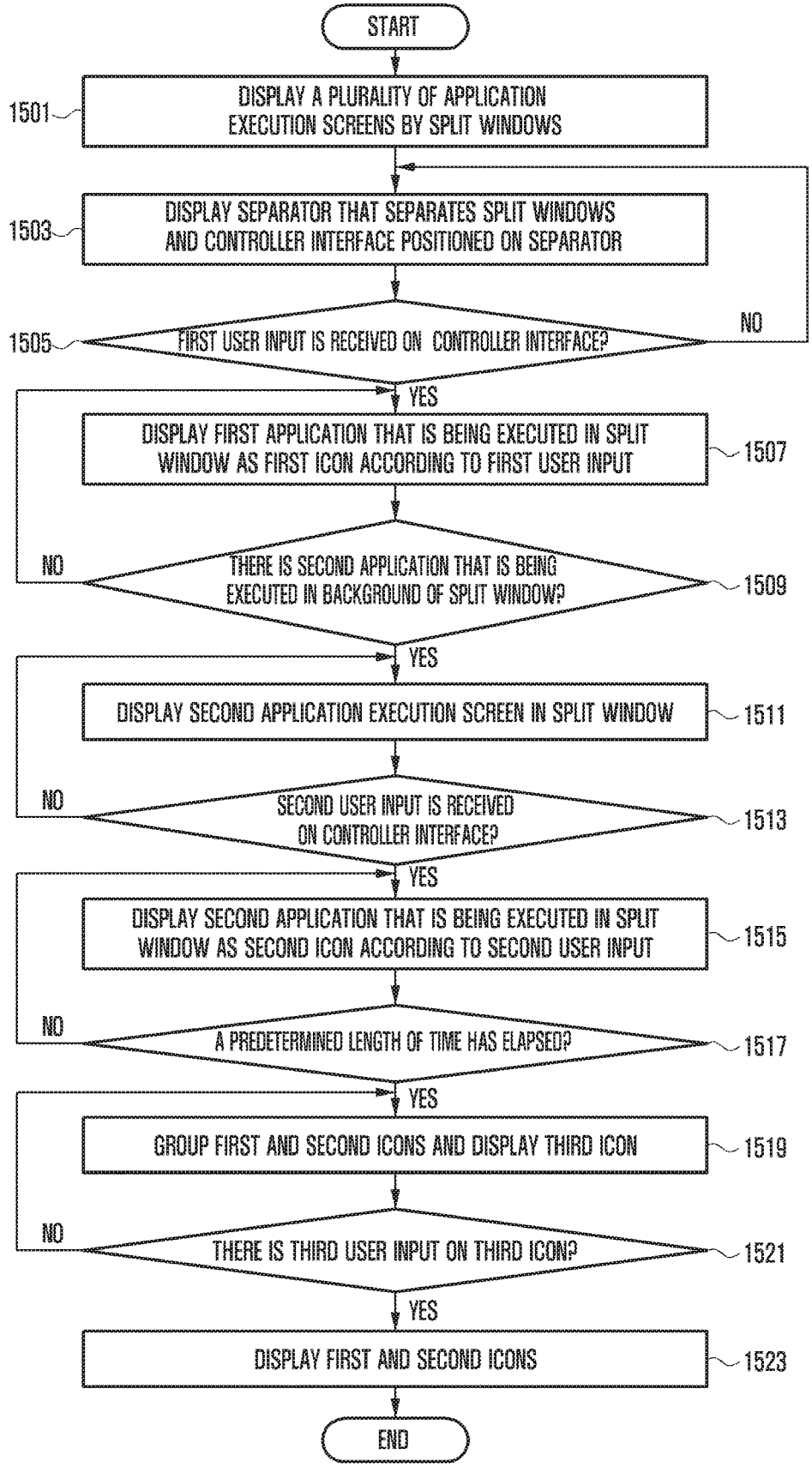
FIG. 15 is a flowchart illustrating a switching method between a split window and an icon in an electronic device according to an embodiment of the present disclosure.

FIG. 15 is a flowchart illustrating a switching method between a split window and an icon in an electronic device according to an embodiment of the present disclosure.

Referring to FIG. 15, in operation 1501, under the control of the processor 120, the electronic device 100 displays a plurality of application execution screens (e.g., a plurality of split windows) on the touch sensitive display not to be superposed on one another.

In operation 1503, under the control of the processor 120, the electronic device 100 displays a separator that separates the plurality of application execution screens (e.g., the plurality of split windows)) not to be superposed on one another on the touch sensitive display by a split window, and a controller interface positioned on the separator.

In the operation 1505, under the control of the processor 120, the electronic device 100 determines whether a first user input is received on the controller interface through the touch sensitive display. When the first user input is not received on the controller interface, the electronic device 100 returns to operation 1503.

For example, the first user input is a touch input on the controller interface displayed as a GUI element and may be a touch and drag input that is input by the user through the touch sensitive display. In another embodiment, the first user input may be a hovering input.

When the first user input is received on the controller interface, the electronic device 100 proceeds to operation 1507. In operation 1507, according to the first unit under the control of the processor 120, the electronic device 100 switches a first application that is being executed in the split window to a first icon and displays the first icon on the touch sensitive display.

In operation 1509, under the control of the processor 120, the electronic device 100 determines whether there is a second application that is being executed in the background of the split window where the first application is switched to the first icon.

When there is no second application that is being executed in the background of the split window where the first application is switched to the first icon, the electronic device 100 returns to operation 1507.

When there is a second application that is being executed in the background of the split window where the first application is switched to the first icon, the electronic device 100 proceeds to operation 1511.

When there is the second application that is being executed in the background of the split window where the first application is switched to the first icon, in operation 1511, the electronic device 100 displays a second application execution screen in the split window where the first application is switched to the first icon, as a foreground.

In operation 1513, the electronic device 100 determines whether a second user input is received on the controller interface through the touch sensitive display under the control of the processor 120. When no second user input is received on the controller interface, the electronic device 100 returns to operation 1511.

When the second user input is received on the controller interface, the electronic device 100 proceeds to operation 1515. In operation 1515, according to the second user input under the control of the processor 120, the electronic device 100 switches the second application that is being executed in the split window to a second icon and displays the second icon on the touch sensitive display. At this time, the second icon may be placed and displayed in the vicinity of the first icon.

In operation 1517, under the control of the processor 120, the electronic device 100 determines whether a predetermined length of time has elapsed. When the predetermined length of time has not elapsed, the electronic device 100 returns to operation 1515. When the predetermined length of time has elapsed, the electronic device 100 proceeds to operation 1519.

When the predetermined length of time has elapsed, in operation 1519 the electronic device 100 may group the first icon and the second icon and display the first icon and the second icon as a third icon on the touch sensitive display, under the control of the processor 120.

In operation 1521, under the control of the processor 120, the electronic device 100 determines whether there is a third input on the third icon which is input through the touch sensitive display.

When there is no third user input, the electronic device 100 returns to operation 1519. When there is the third user input, in operation 1523, the electronic device 100 releases the grouped first and second icons and individually displays the first icon and the second icon.

Figure 16A:
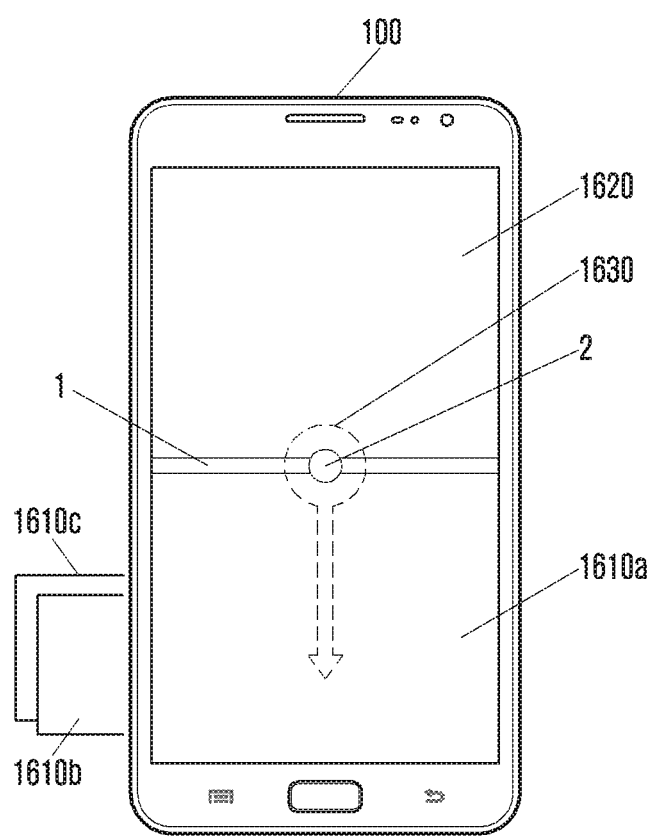
FIGS. 16A, 16B and 16C are diagrams illustrating operation screens of performing switching between a split window and an icon in an electronic device according to an embodiment of the present disclosure.
Figure 16B:
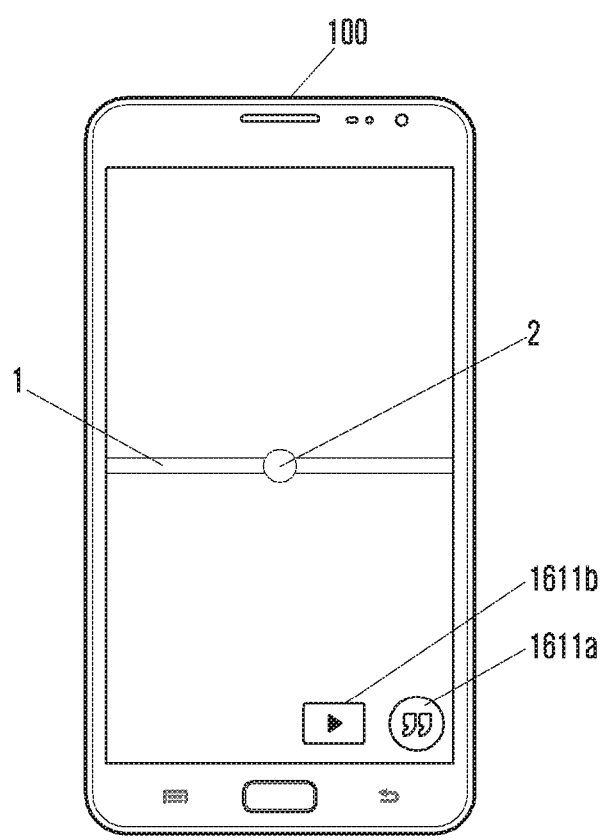
Figure 16C:
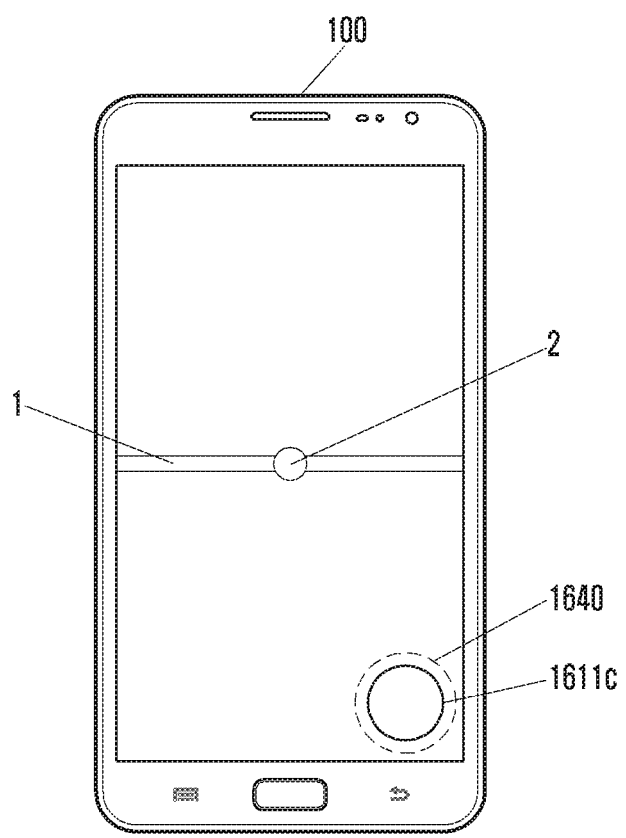

FIG. 16A-16C are diagrams illustrating operation screens of performing switching between a split window and an icon in an electronic device according to another embodiment of the present disclosure.

Referring to FIG. 16A, the electronic device 100 displays a plurality of application execution screens on the touch sensitive display by split windows (e.g., a plurality of split windows 1610a and 1620) not to be superposed on one another. The electronic device 100 displays a separator 1 that separates the plurality of split windows 1610a and 1620 and a controller interface 2 positioned on the separator 1. The split window 1610a that is displaying the first application execution screen in the foreground on the touch sensitive display, may include a second application execution screen 1610b or a third application execution screen 1610c in the background.

The electronic device 100 receives a user input 1630 on the controller interface 2 through the touch sensitive display. The user input 1630 is a touch input on the controller interface displayed as a GUI element, and may include a touch and drag input that is input by the user through the touch sensitive display.

Referring to FIG. 16B, according to the user input 1630, the electronic device 100 switches the split window 1610a related to the first application execution screen that is being activated or in the direction of the drag input direction, to a first icon 1611a and displays the first icon 1611a on the touch sensitive display. In addition, according to the user input 1630, the electronic device 100 switches the split window 1610b related to a second application execution screen that is being activated or in the drag input direction, to a second icon 1611b, and displays the second icon 1611b on the touch sensitive display. The first icon 1611a and the second icon 1611b may be sequentially and in parallel according to the icon switching order.

Referring to FIG. 16C, when a predetermined length of time has elapsed, the first icon 1611a and the second icon 1611b are grouped and then changed to a third icon 1611c that is displayed on the touch sensitive display of the electronic device 100. At this time, when a user input 1640 on the third icon 1611c is received, the electronic device 100 may release the grouped first and second icons 1611a and 1611b and individually display the first and second icons 1611a and 1611b.

Figure 17:
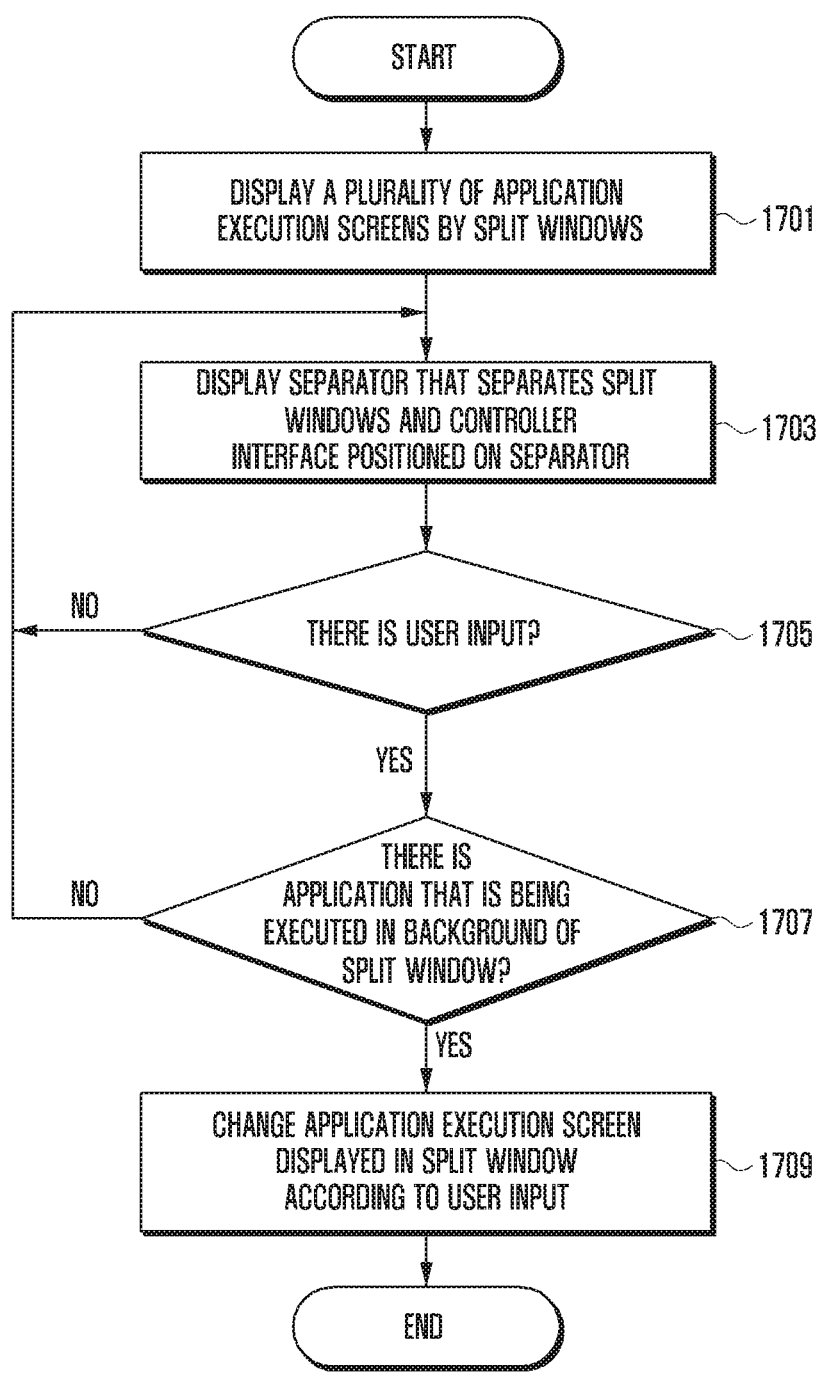
FIG. 17 is a flowchart illustrating a method of converting a background execution screen on a split window of an electronic device according to an embodiment of the present disclosure.

FIG. 17 is a flowchart illustrating a method of converting a background execution screen on a split window of an electronic device according to an embodiment of the present disclosure.

Referring to FIG. 17, in operation 1701, under the control of the processor 120, the electronic device 100 displays a plurality of application execution screens on the touch sensitive display not to superposed on one another by split windows (e.g., a plurality of split windows).

In operation 1703, under the control of the processor 120, the electronic device 100 display a separator that separates the split windows and a controller interface positioned on the separator on the touch sensitive display.

In operation 1705, under the control of the processor 120, the electronic device 100 determines whether a user input is received on the controller interface through the touch sensitive display. When no user input is received on the controller interface the electronic device 100 returns to operation 1703.

For example, the user input is a touch input on the controller interface displayed as a GUI element, and may be a touch and drag input that is input by the user through the touch sensitive display. At this time, the user input may be an input that makes the controller interface movable on the separator, in which the user input may be a touch and drag action on the separator. In addition, according to the user input, the electronic device 100 may display on the touch sensitive display that the controller interface implemented as the GUI element also moves. In another embodiment, the user input may be a hovering input.

When the user input is received on the controller interface, the electronic device 100 determines, in operation 1707, whether there is an application under execution in the background of the activated split window. When there is no application under execution in the background of the activated split window, the electronic device 100 returns to operation 1703.

When there is an application under execution in the background of the activated split window, the electronic device 100 changes, in operation 1709, the application execution screen displayed on the split window according to the user input. In an embodiment, in operation 1709, according to the user input, the electronic device 100 changes and displays the foreground execution screen and the background execution screen in the split window.

Figure 18A:
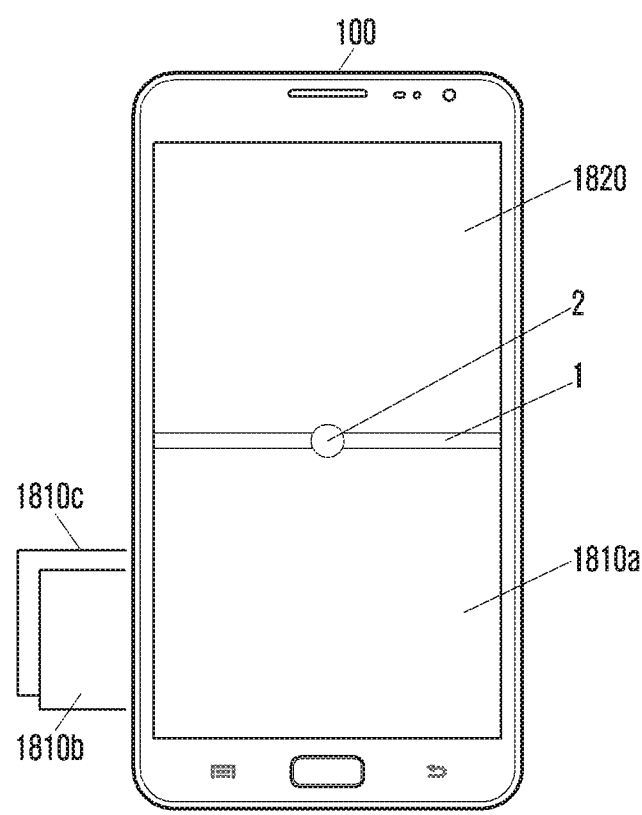
FIGS. 18A and 18B are diagrams illustrating operation screens of converting a background execution screen on split window in an electronic device according to an embodiment of the present disclosure.
Figure 18B:
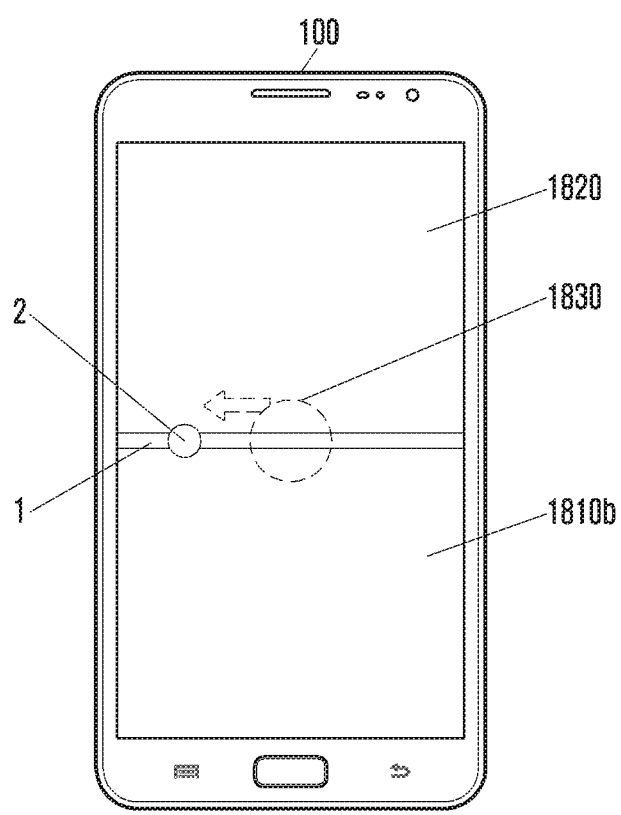

FIGS. 18A and 18B are diagrams illustrating operation screens of converting a background execution screen on split window in an electronic device according to an embodiment of the present disclosure.

Referring to FIG. 18A, the electronic device 100 displays a plurality of application execution screens on the touch sensitive display by split windows (e.g., a plurality of split windows 1810*a* and 1820). The electronic device 100 displays a separator 1 that separates a plurality of split windows 1810*a* and 1820 and a controller interface 2 positioned on the separator 1. The split window 1810*a* that is displaying a first application execution screen in the foreground on the touch sensitive display may include a second application execution screen 1810*b* or a third application execution screen 1810*c* in the background.

Referring to FIG. 18B, the electronic device 100 receives a user input 1830 on the controller interface 2 through a touch sensitive display. For example, the user input 1830 is a touch input on the controller interface displayed as a GUI element, and may be a touch and drag input that is input by the user through the touch sensitive display. At this time, the user input may be an input that makes the controller interface 2 movable on the separator 1, in which the user input 1830 may be a touch and drag operation on the separator 1. In addition, according to the user input, the electronic device 100 may display that the controller interface 2 implemented as the GUI element also moves on the touch sensitive display.

Figure 19:
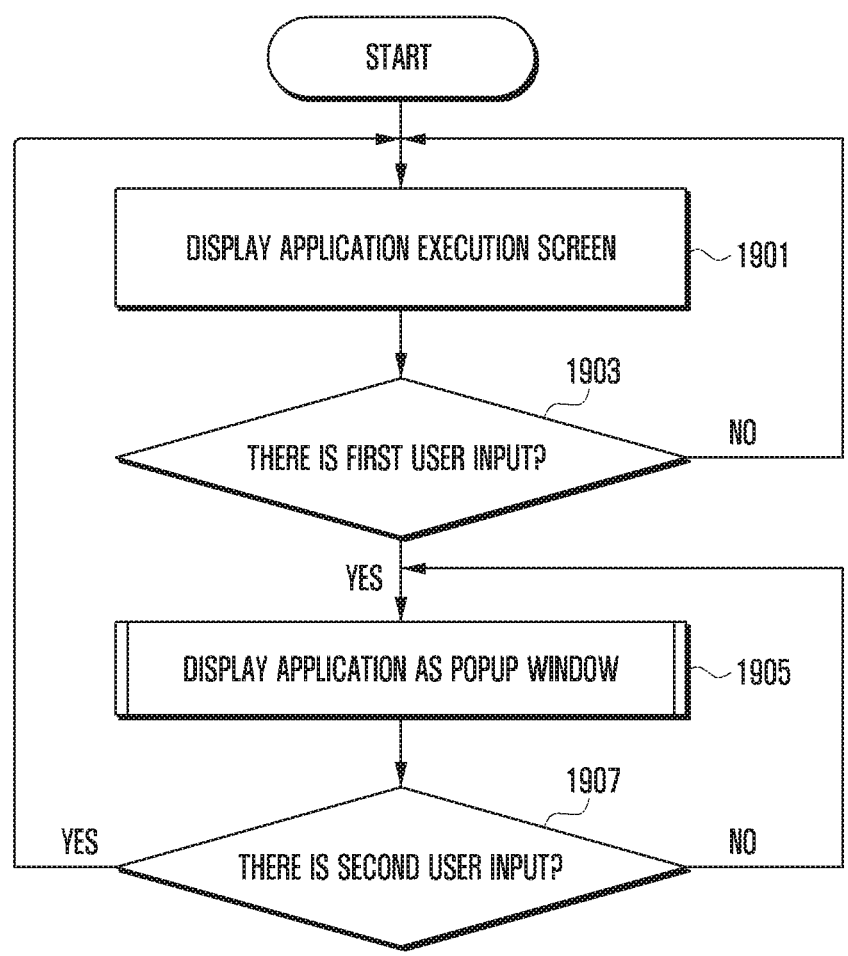
FIG. 19 is a flowchart illustrating a switching method of a popup window in an electronic device according to an embodiment of the present disclosure.

FIG. 19 is a flowchart illustrating a switching method of a popup window in an electronic device according to an embodiment of the present disclosure.

Referring to FIG. 19, in operation 1901, under the control of the processor 120, the electronic device 100 may display an application execution screen on the touch sensitive display. According to an embodiment, under the control of the processor 120, the electronic device 100 may display an application execution screen as a whole screen on the touch sensitive display. According to another embodiment, under the control of the processor 120, the electronic device 100 may display an application execution screen as a split window on the touch sensitive display.

In operation 1903, the electronic device 100 may determine whether there is a first user input through the touch sensitive display. When it is determined that there is no first user input through the touch sensitive display, the electronic device 100 returns to operation 1901. The first user input is a touch and dag input that starts from one of the corners of the whole screen and moves toward a corner positioned in the diagonal direction. For example, the first user input may be input from the left upper corner of the whole screen toward the right lower corner on the diagonal direction. In another embodiment, the first user input is a touch and drag input that starts from one of the corners of at least one split window and moves to the corner positioned in the diagonal direction.

When it is determined there is a first user input through the touch sensitive display, in operation 1905, the electronic device 100 switches the application execution screen to an execution screen displayed to be superposed on at least a portion (e.g., popup window) and displays the execution screen on the touch sensitive display. According to an embodiment, in operation 1905, the electronic device 100 converts the application execution screen from the whole screen to the popup window and displays the popup window on the touch sensitive display. According to another embodiment, in operation 1905, the electronic device 100 converts the application execution screen from the split window to the popup window, and displays the split window on the touch sensitive display.

In operation 1907, the electronic device 100 may determine whether there is a second user input through the touch sensitive display. When it is determined there is no second user input through the touch sensitive display, the electronic device 100 returns to 1905.

The second user input is a touch and drag input that starts from one of the corners of the popup window and moves toward the same corner of the whole screen. For example, the second user input may be input from the left upper corner of the popup window toward the left upper corner of the whole screen.

When it is determined that there is the second user input through the touch sensitive display, the electronic device 100 returns to operation 1901.

FIGS. 20A to 20F are diagrams illustrating operation screens of performing switching between popup windows in an electronic device according to an embodiment of the present disclosure.

Figure 20A:
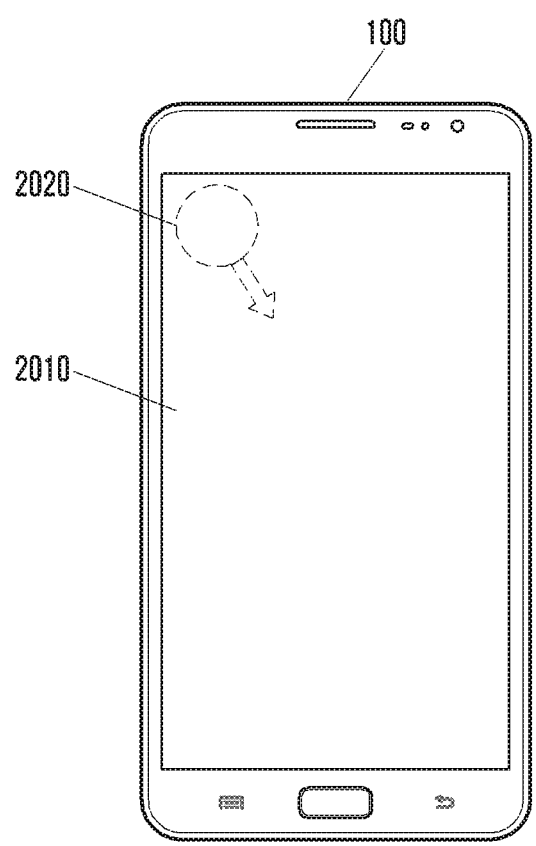
FIGS. 20A, 20B, 20C, 20D, 20E and 20F are diagrams illustrating operation screens of performing switching between popup windows in an electronic device according to an embodiment of the present disclosure.

Referring to FIG. 20A, the electronic device 100 displays an application execution screen as a whole screen 2010 on the touch sensitive display. When there is a first user input 2020, as in the screen of FIG. 20B, the electronic device switches the application execution screen from the whole screen 2010 to an execution screen displayed to be superimposed on at least a portion (e.g., popup window 2040) and display the execution screen on the touch sensitive display. At this time, the first user input has a direction from the left upper corner of the whole screen to the right lower corner of the whole screen in the diagonal direction.

Figure 20B:
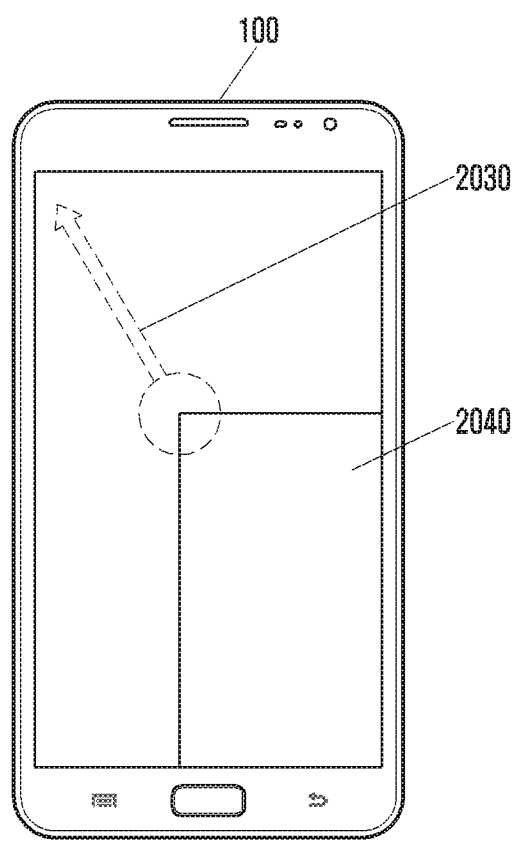

Referring to FIG. 20B, the electronic device 100 displays the application execution screen as the popup window 2040 on the touch sensitive display. When there is a second user input 2030, the electronic device 100 converts the application execution screen from the popup window 2040 to the whole screen 2010 and displays the whole screen 2010 on the touch sensitive display, as in the screen of FIG. 20A. At this time, the second user input has a direction from the left upper corner of the popup window to the left upper corner of the whole screen in the same direction.

Figure 20C:
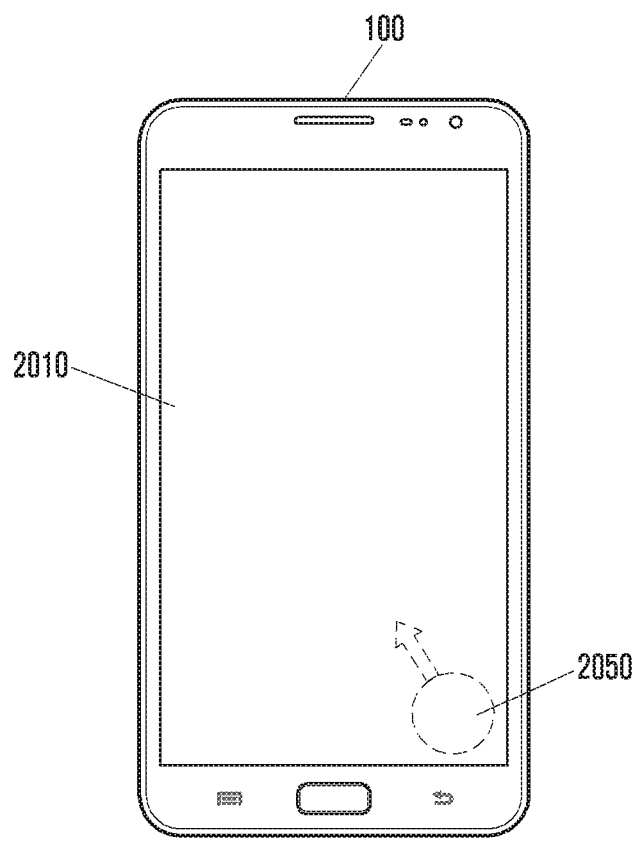
Figure 20D:
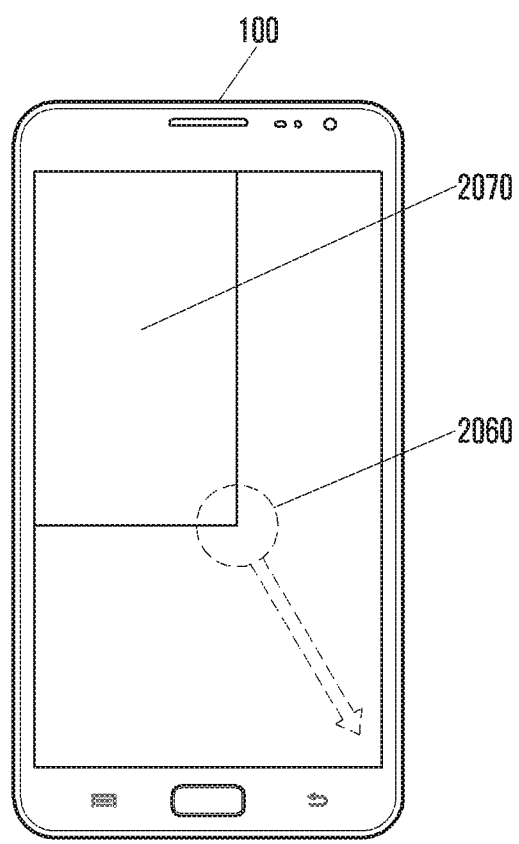

Referring to FIG. 20C, the electronic device 100 displays the application execution screen as a whole screen 2010 on the touch sensitive display, and when there is a first user input 2050, the electronic device 100 converts the application execution screen from the whole screen 2010 to a popup window 2070 and displays the popup window 2070 on the touch sensitive display, as in the screen of FIG. 20D. At this time, the first user input has a direction from the right lower corner of the whole screen to the left upper corner of the whole screen in the diagonal direction.

Referring to FIG. 20D, the electronic device 100 displays the application execution screen as a popup window 2070 on the touch sensitive display, and when there is a second user input 2060, the electronic device 100 switches the application execution screen from the popup window 2070 to a whole screen 2010 and displays the whole screen 2010 on the touch sensitive display, as in the screen of FIG. 20C. At this time, the second user input has a direction from the right lower corner of the popup window to the right lower corner of the whole screen in the same direction.

Figure 20E:
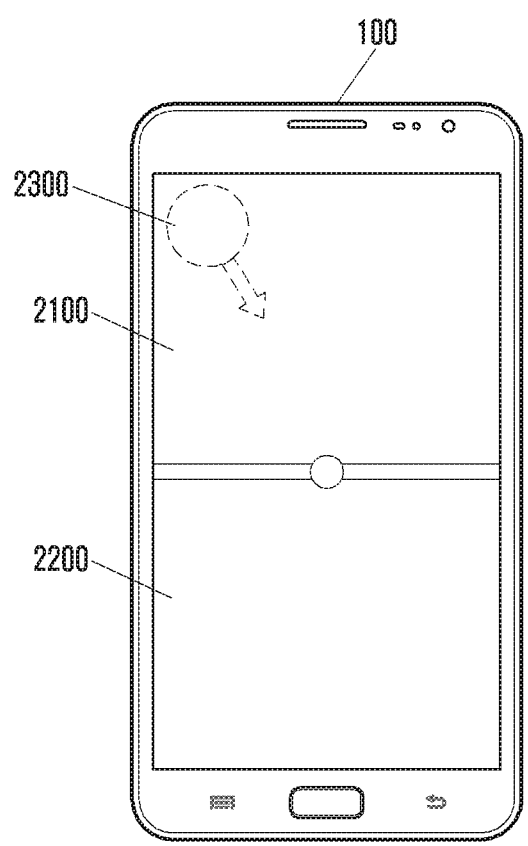

Referring to FIG. 20E, the electronic device 100 displays a first application execution screen as a first split window 2100 and a second application execution screen as a second split window 2200 on the touch sensitive display, and when there is a first user input 2300 in the first split window 2100, the electronic device 100 converts the application execution screen from the first split window 2100 to a popup window 2400 and displays the popup window 2400 on the touch sensitive display as in the screen of FIG. 20B. At this time, the first user input has a direction from the left upper corner of the first split window 2100 to the right lower corner of the first split window 2100 or to the right lower corner of the whole screen in the diagonal direction.

Figure 20F:
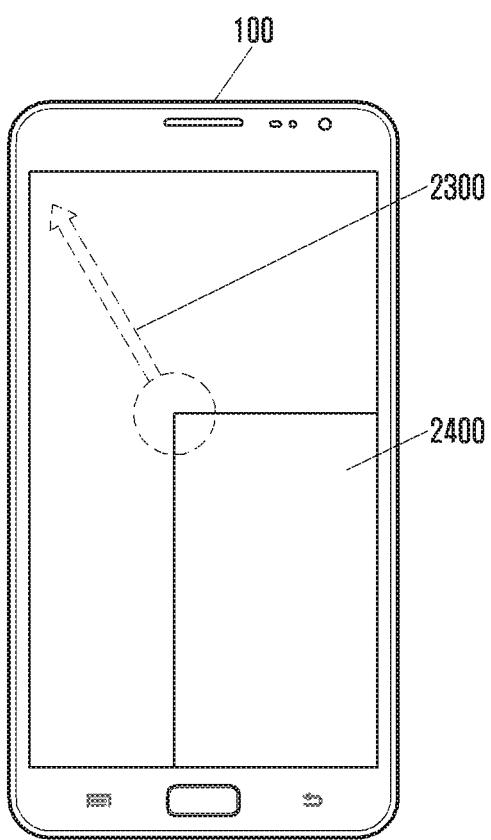

Referring to FIG. 20F, the electronic device 100 displays an application execution screen as a popup window 2400 on the touch sensitive display, and when there is a second user input 2300, the electronic device 100 switches the application execution screen from the popup window 2400 to one or more execution screens (e.g., a first split window 2100 and a second split window 2200) displayed on the touch sensitive display not to be superposed on one another, and displays the execution screens on the touch sensitive display, as in the screen of FIG. 20E. At this time, the second user input may have a direction from the left upper corner of the popup window to the left upper corner of the whole screen in the same direction.

Figure 21:
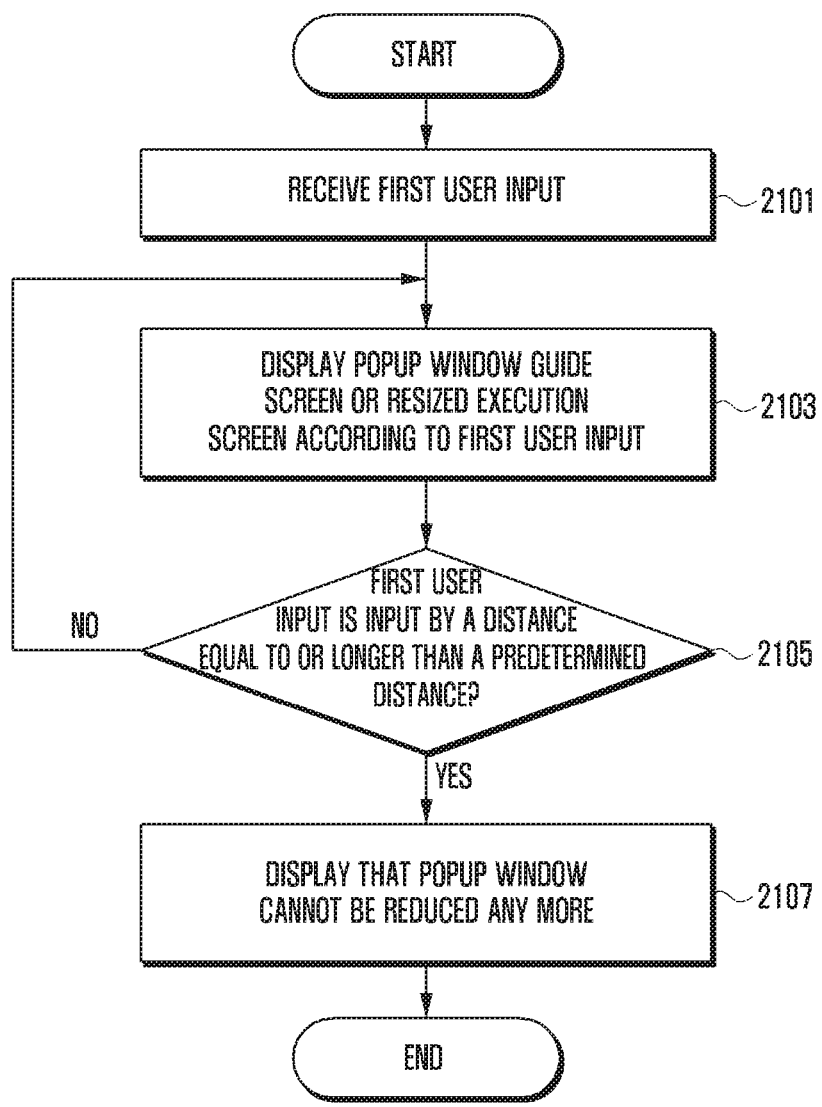
FIG. 21 is a flowchart illustrating a method of switching an application execution screen to a popup window, and displaying the popup window on a touch sensitive display in an electronic device according to an embodiment of the present disclosure.

FIG. 21 is a flowchart illustrating a method of switching an application execution screen to an execution screen (e.g., a popup window) displayed to be superposed on at least a portion of another application execution screen, and displaying the popup window on a touch sensitive display in an electronic device according to an embodiment of the present disclosure.

Referring to FIG. 21, in operation 2101, the electronic device 100 receives a first user input through the touch sensitive display.

In operation 2103, under the control of the processor 120, the electronic device 100 may display a popup window guide screen according to the first user unit or a resized execution screen on the touch sensitive display. For example, the popup window guide screen displays an execution using a corner without resizing the execution screen.

In operation 2105, the electronic device 100 determines whether the shift distance of the first user input that is input through the touch sensitive display, is greater than or equal to a predetermined distance. When it is determined that the shift distance of the first user input that is input through the touch sensitive display, is less than or equal to than the predetermined distance, the electronic device 100 returns to operation 2103.

When it is determined that the shift distance of the first user input that is input through the touch sensitive display is greater than or equal tothan the predetermined distance, the electronic device 100 displays, on the touch sensitive display, that the popup window cannot be further reduced in operation 2107. The electronic device 100 may display, on the touch sensitive display, that the popup window cannot be further reduced by indicating a warning phrase to the user, making the popup window guide screen flicker, or changing the color of the corners of the popup window guide screen.

FIGS. 22A to 22D are diagrams illustrating operation screens of converting an application execution screen to a popup window and displaying the popup window on a touch sensitive display in the electronic device according to an embodiment of the present disclosure.

Figure 22A:
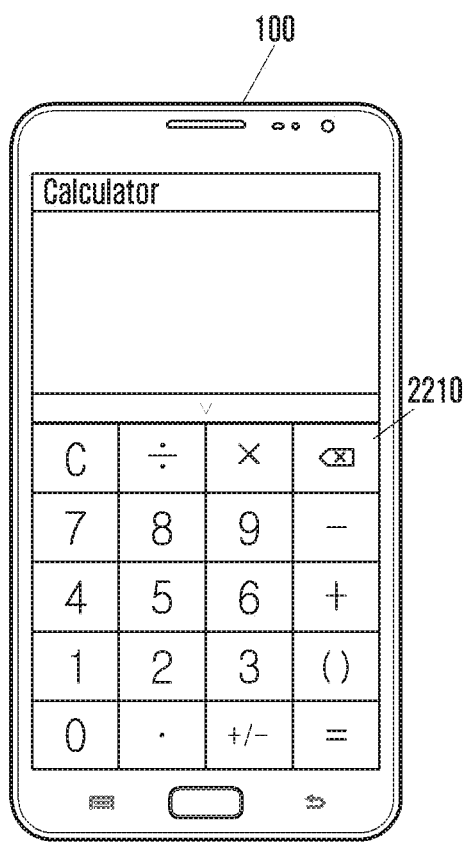
FIGS. 22A, 22B, 22C and 22D are diagrams illustrating operation screens of converting an application execution screen to a popup window and displaying the popup window on a touch sensitive display in an electronic device according to an embodiment of the present disclosure.

Referring to FIG. 22A, the electronic device 100 may display an application execution screen as a whole screen 2210 on the touch sensitive display.

Figure 22B:
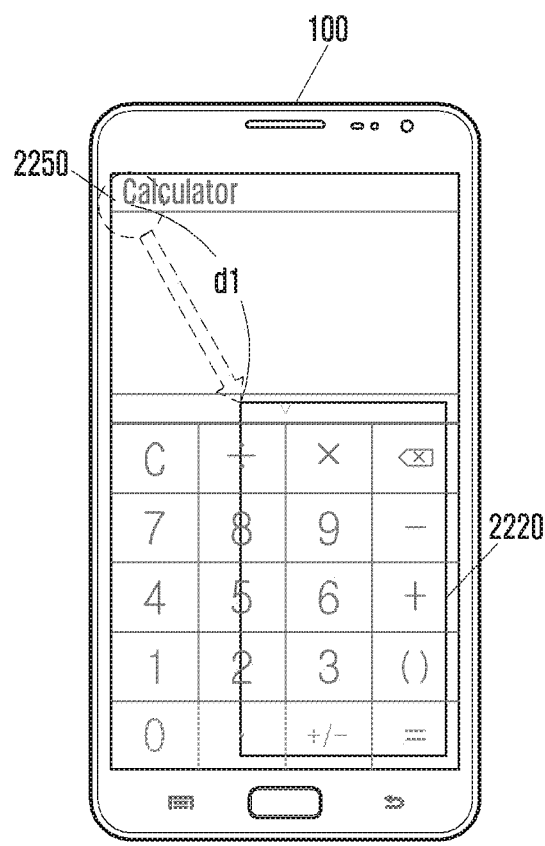

Referring to FIG. 22B, the electronic device 100 may display a popup window guide screen 2220 on the touch sensitive display according to a first user input 2250 that is input by a first distance d1.

Figure 22C:
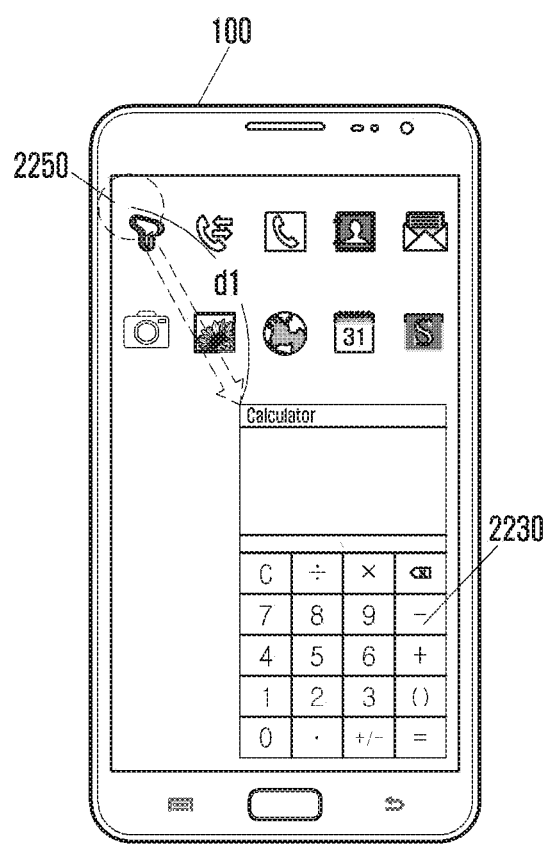

Referring to FIG. 22C, the electronic device 100 may display an execution region screen 2230 resized according to the first user input 2250 that is input by the first distance d1, on the touch sensitive display.

Figure 22D:
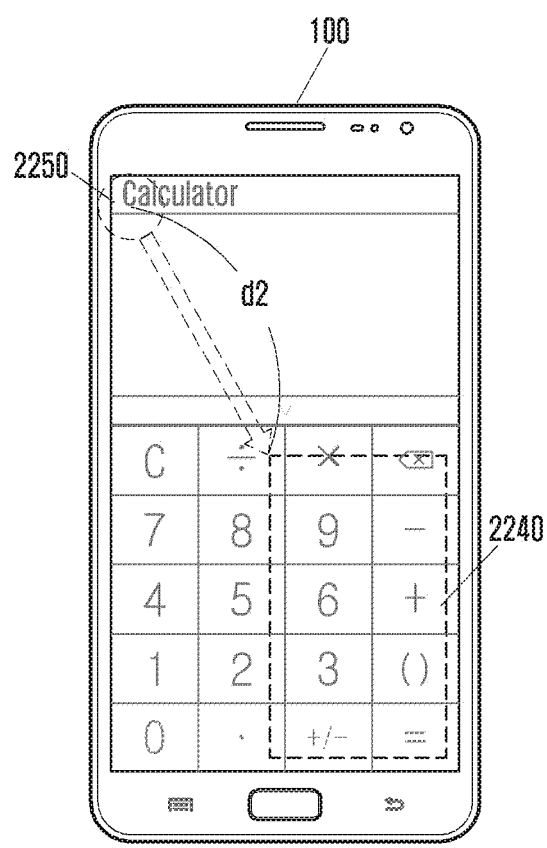

Referring to FIG. 22D, when the first user input 2250 is input by a second distance d2 that is greater than or equal to than the predetermined distance, the electronic device 100 may display that the popup window cannot be further reduced, on the touch sensitive display.

Figure 23:
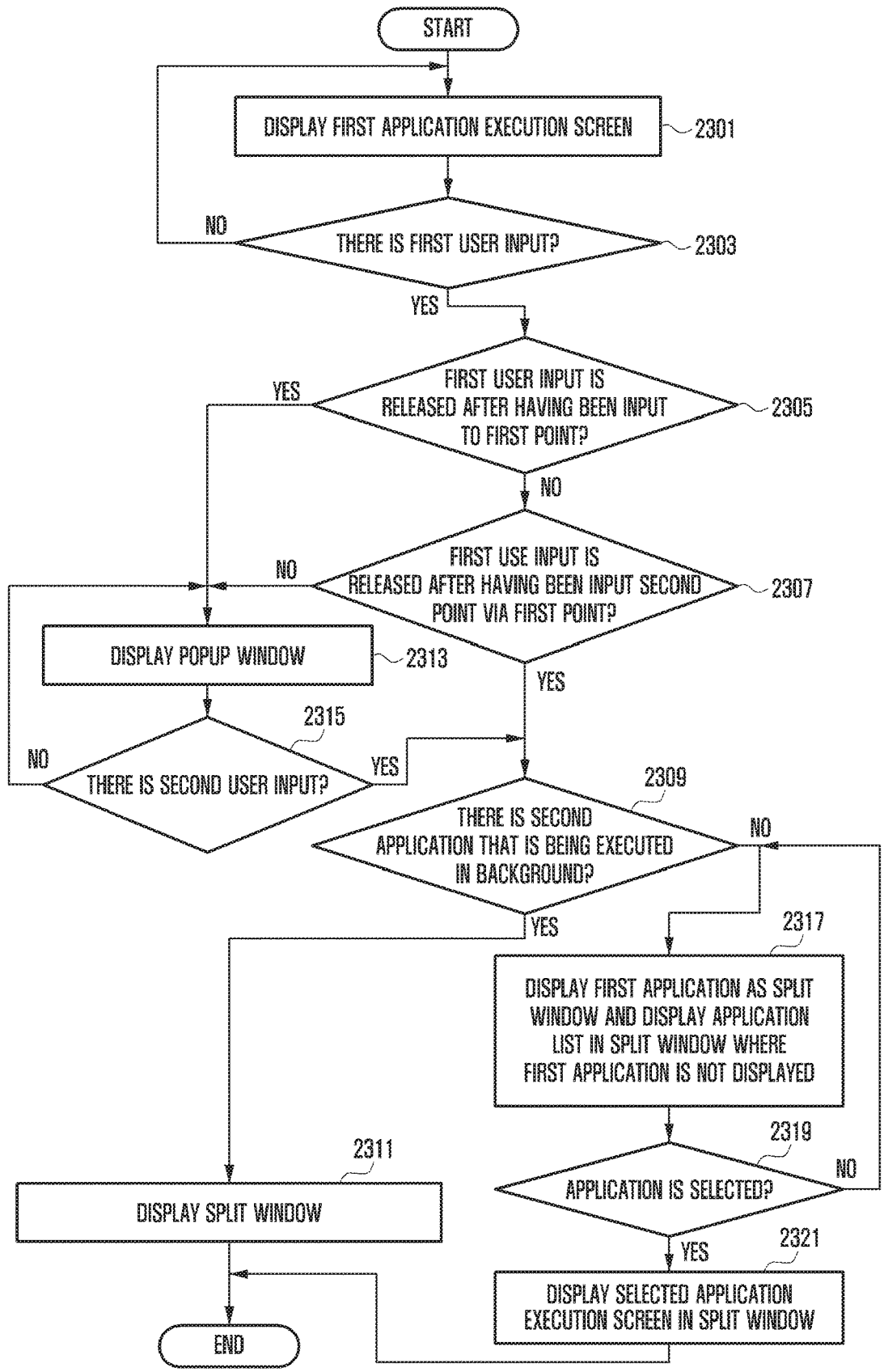
FIG. 23 is a flowchart illustrating a window switching method in an electronic device according to an embodiment of the present disclosure.

FIG. 23 is a flowchart illustrating a window switching method in an electronic device 100 according to an embodiment of the present disclosure.

Referring to FIG. 23, in operation 2301, the electronic device 100 displays a first application execution screen on the touch sensitive display under the control of the processor 120.

In operation 2303, the electronic device 100 determines whether there is a first user input through the touch sensitive display. When there is no first user input, the electronic device 100 returns to operation 2301.

When there is the first user input, in operation 2305, the electronic device 100 determines whether the first user input is released after the first user input was input to a first point on the touch sensitive display.

When it is determined that the first user input is released after the first user input was input to the first point, in operation 2313, the electronic device 100 converts the first application execution screen to a popup window screen and displays the popup window screen. In operation 2315, the electronic device 100 determines whether there is a second user input through the touch sensitive display. When there is no second user input, the electronic device 100 returns to operation 2313, and displays an execution screen (e.g., a popup window) displayed to be superposed on at least a portion. When there is the second user input, the electronic device 100 proceeds to operation 2309.

When it is determined that the first user input is not released after the first user input was input to the first point, in operation 2307, the electronic device 100 determines whether the first user input is released after the first user input was input to a second point via the first point on the touch sensitive display.

When the first user input is released without having been input to the second point via the first point, the electronic device 100 returns to operation 2313 and displays the first application execution screen as an execution screen (e.g., a popup window) displayed to be superposed on at least a portion of the.

The first point is positioned in a direction oriented toward a diagonal corner from any one of four corners of a whole screen or a split window according to the first user input, and the second point is positioned perpendicular to one of the corners that are not occupied by the popup window from the first point. The shift direction of the second user input is directed perpendicular to one of the corners that are not occupied by the popup window.

When it is determined that the first user input is released after the first user input was input to the second point via the first point or it is determined that there is the second user input, in operation 2309, the electronic device 100 determines whether there is a second application that is being executed in the background under the control of the processor 120.

When there is the second application that is being executed in the background, in operation 2311, the electronic device 100 displays the first application execution screen and the second application execution screen on the touch sensitive display as split windows under the control of the processor 120.

When there is no second application which is being executed in the background, in operation 2317, the electronic device 100 displays, under the control of the processor 120, the first application as one or more execution screens (e.g., split window) displayed on the touch sensitive display not to be superposed on one another, and displays an application list in the split window where the first application is not displayed.

In operation 2319, under the control of the processor 120, the electronic device 100 determines whether there is a user input that selects an application in the application list through the touch sensitive display. When there is no user input related to application selection, the electronic device 100 returns to operation 2317.

When there is the user input related to application selection, in operation 2321, under the control of the processor 120, the electronic device 100 additionally displays the selected application execution screen as a split window on the touch sensitive display.

FIGS. 24A to 24E is a diagram illustrating operation screens of performing window switching in the electronic device 100 according to another embodiment of the present disclosure.

Figure 24A:
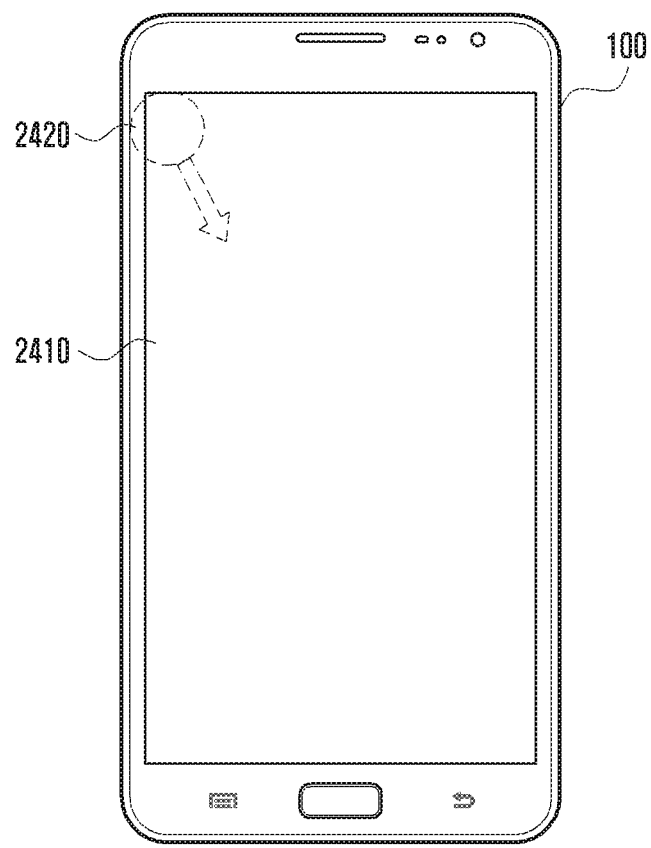
FIGS. 24A, 24B, 24C, 24D and 24E are diagrams illustrating operation screens of performing window switching in an electronic device according to an embodiment of the present disclosure.

Referring to FIG. 24A, the electronic device 100 may display a first application execution screen as a whole screen 2410 on the touch sensitive display.

Figure 24B:
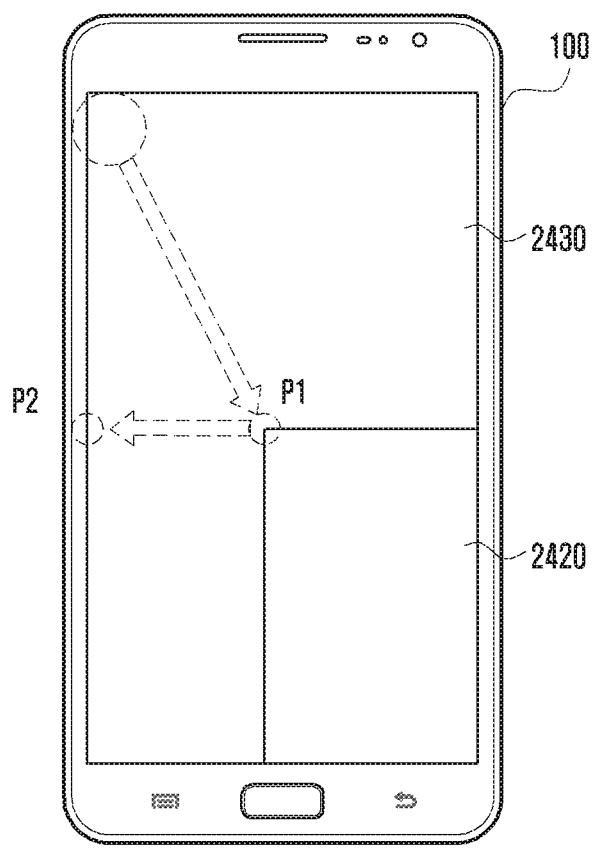

Referring to FIG. 24B, when the first user input 2420 is released after the first user input was shifted to the first point p1, the electronic device 100 may display the first application execution screen as a popup window 2420 on the touch sensitive display.

Figure 24C:
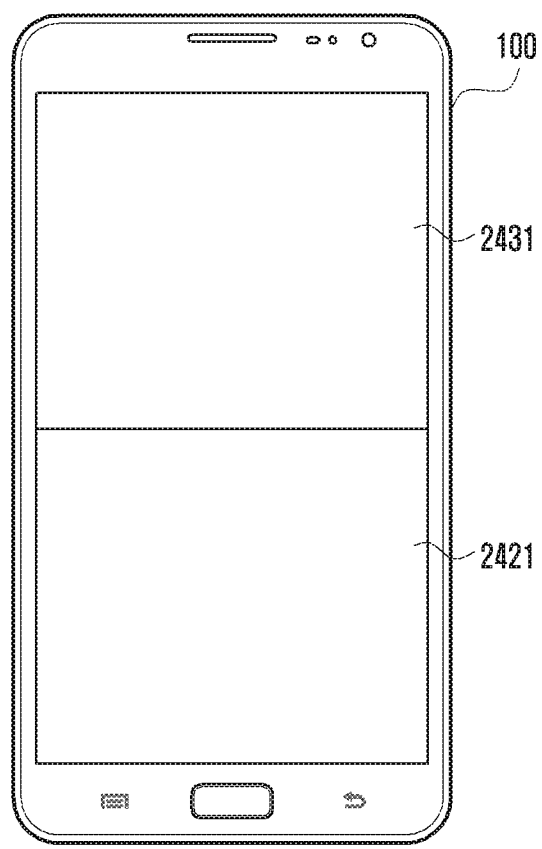

Referring to FIG. 24C, when the first user input 2420 is released after the first user input was shifted to the second point P2 via the first point p1, the electronic device 100 may display the first application execution screen as a split window 2421 on the touch sensitive display. At this time, when there is a second application which is being executed in the background, the second application execution screen is displayed on the touch sensitive display as a split window 2431.

Figure 24D:
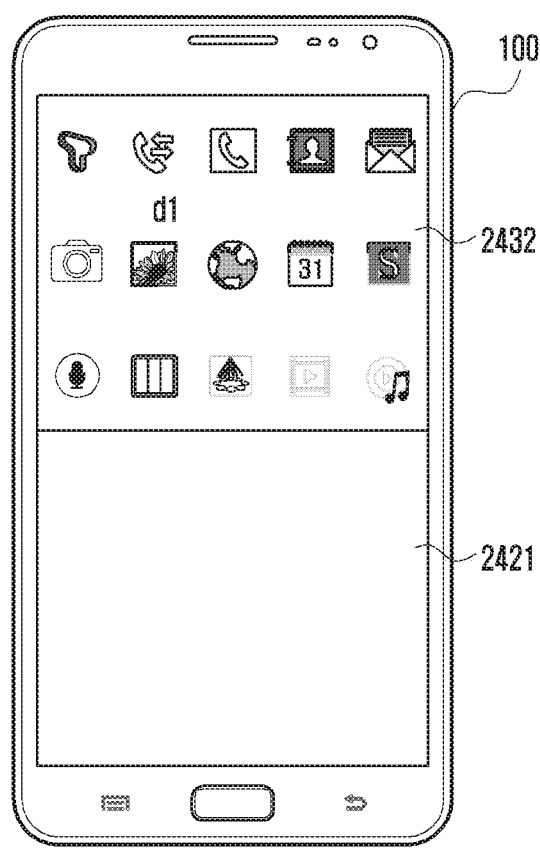

Referring to FIG. 24D, when there is no second application that is being executed in the background, the electronic device 100 displays first application execution screen as the split window 2421 on the touch sensitive display, and displays the application list in the remaining split window 2432.

Figure 24E:
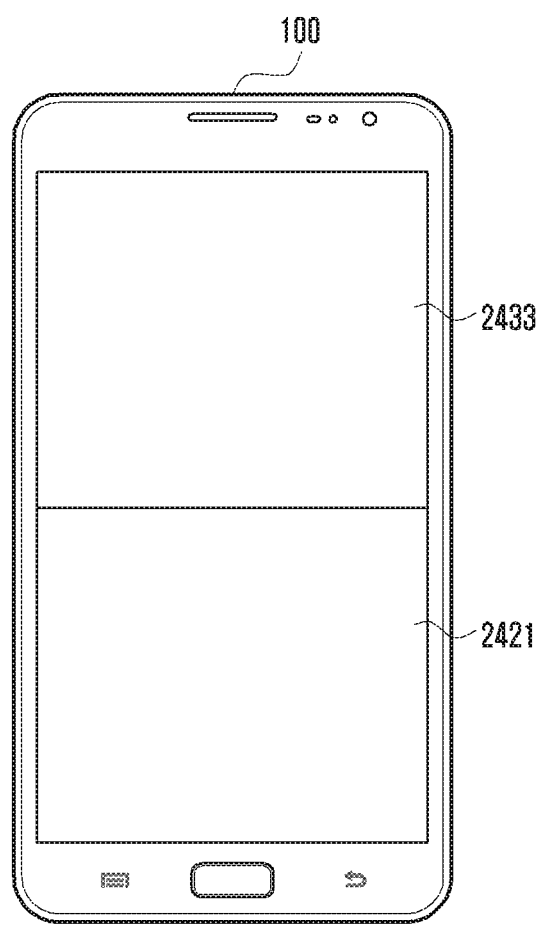

Referring to FIG. 24E, when one application is selected in the application list, the selected application execution screen may be displayed as a split window 2433.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touch sensitive display;
at least one processor; and
a memory storing instructions, which when executed by the at least one processor, cause the electronic device to:
display a plurality of application execution screens respectively in a plurality of split windows on the touch sensitive display, an application execution screen of the plurality of application execution screens not being superposed on another application execution screen of the plurality of application execution screens;
change a first split window of the plurality of split windows into a pop-up window in response to receiving a first touch input on a controller interface item corresponding to the first split window, displayed on the touch sensitive display, a second split window of the plurality of split windows being extended to a first split window region on the touch sensitive display simultaneously;
move a position of the pop-up window according to a second touch input on the controller interface item;
provide guide information through the touch sensitive display based on the pop-up window, moved according to the second touch input, being at least partially disposed on a switching region located at a predetermined boundary region of the touch sensitive display, the guide information notifying a position where a split window, changed from the pop-up window, is to be displayed; and
change the pop-up window into the split window in response to detecting the second touch input is released in the switching region.

2. The electronic device of claim 1, wherein the guide information is a graphical user interface (GUI) element that indicates the moved pop-up window is positioned in the switching region.

3. The electronic device of claim 1, wherein the split windows are positioned vertically with respect to each other, and the switching region corresponds to one of a predetermined upper boundary region and a predetermined lower boundary region of the touch sensitive display.

4. The electronic device of claim 1, wherein the switching region corresponds to one or more combinations of a predetermined upper boundary region, a predetermined lower boundary region, a predetermined left boundary region, and a predetermined right boundary region of the touch sensitive display.

5. The electronic device of claim 1, wherein a touch input is at least one of a tap input, long press input, short press input, hovering input and a drag input.

6. The electronic device of claim 1, wherein the instructions cause the electronic device to:
display the pop-up window as a transparent or semi-transparent split window when the pop-up window is located in the switching region.

7. The electronic device of claim 1, wherein the instructions cause the electronic device to:
perform the displaying of the pop-up window such that a size of the pop-up window is smaller than a size of the first split window of the plurality of split windows.

8. A method for operating an electronic device including a touch sensitive display, the method comprising:
displaying a plurality of application execution screens respectively in a plurality of split windows on the touch sensitive display, an application execution screen of the plurality of application execution screens not being superposed on another application execution screen of the plurality of application execution screens;
changing a first split window of the plurality of split windows into a pop-up window in response to receiving a first touch input on a controller interface item corresponding to the first split window, displayed on the touch sensitive display, a second split window of the plurality of split windows being extended to a first split window region on the touch sensitive display simultaneously;
moving a position of the pop-up window according to a second touch input on the controller interface item;
providing guide information through the touch sensitive display based on the pop-up window, move according to the second touch input, being at least partially disposed on a switching region located at a predetermined boundary region of the touch sensitive display, the guide information notifying a position where a split window, changed from the pop-up window, is to be displayed; and changing the pop-up window into the a-split window in response to detecting the second touch input is released in the switching region.

9. The method of claim 8, wherein the guide information is a graphical user interface (GUI) element that indicates the moved pop-up window is positioned in the switching region.

10. The method of claim 8, wherein the split windows are positioned vertically with respect to each other, and the switching region corresponds to one of a predetermined upper boundary region and a predetermined lower boundary region of the touch sensitive display.

11. The method of claim 8, wherein the switching region corresponds to one or more combinations of a predetermined upper boundary region, a predetermined lower boundary region, a predetermined left boundary region, and a predetermined right boundary region of the touch sensitive display.

12. The method of claim 8, wherein a touch input is at least one of a tap input, long press input, short press input, hovering input and a drag input.

13. The method of claim 8, the method further comprises:
displaying the pop-up window as a transparent or semi-transparent split window when the pop-up window is located in the switching region.

14. The method of claim 8, wherein the changing the first split window of the plurality of split windows into the pop-up window in response to receiving the first touch input on the controller interface item corresponding to the first split window further comprising:
performing the displaying of the pop-up window such that a size of the pop-up window is smaller than a size of the first split window of the plurality of split windows.

\* \* \* \* \*